(12) United States Patent
Thubert et al.

(10) Patent No.: US 9,319,332 B2
(45) Date of Patent: Apr. 19, 2016

(54) DISTRIBUTED RESCHEDULING OF BOUNDED FLOWS IN A TIME SENSITIVE NETWORK

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 14/334,821

(22) Filed: Jul. 18, 2014

(65) Prior Publication Data

US 2016/0021017 A1 Jan. 21, 2016

(51) Int. Cl.
*H04L 12/26* (2006.01)
*H04L 12/841* (2013.01)
*H04L 12/803* (2013.01)

(52) U.S. Cl.
CPC .............. *H04L 47/28* (2013.01); *H04L 47/125* (2013.01)

(58) Field of Classification Search
CPC ......... H04L 47/28; H04L 47/00; H04L 47/10; H04L 47/125; H04L 47/12; H04L 47/17
See application file for complete search history.

(56) References Cited

U.S. PATENT DOCUMENTS

| | | | |
|---|---|---|---|
| 8,040,857 B2 | 10/2011 | Wang et al. | |
| 8,228,859 B2 * | 7/2012 | Wang | H04B 1/713 370/329 |
| 8,406,248 B2 | 3/2013 | Pratt, Jr. et al. | |
| 8,660,108 B2 | 2/2014 | Pratt, Jr. et al. | |
| 8,798,084 B2 | 8/2014 | Pratt, Jr. et al. | |
| 8,824,414 B2 | 9/2014 | Igo, Jr. et al. | |
| 2003/0161303 A1 | 8/2003 | Mehrvar et al. | |
| 2006/0019662 A1 * | 1/2006 | Andrews | H04L 45/00 455/435.3 |
| 2013/0016759 A1 * | 1/2013 | Hui | H04B 1/713 375/135 |
| 2013/0022042 A1 | 1/2013 | Vasseur et al. | |

OTHER PUBLICATIONS

Gnawali, et al., "The Minimum Rank with Hysteresis Objective Function", Request for Comments 6719, Sep. 2012, 13 pages, Internet Engineering Task Force Trust.
Palattella, et al., "Terminology is IPv6 over the TSCH mode of IEEE 802.15.4e", 6TiSCH Internet-Draft, <draft-ietf-6tisch-terminology-02>, Jul. 4, 2014, 12 pages, Internet Engineering Task Force Trust.
Thubert P., "Objective Function Zero for the Routing Protocol for Low-Power and Lossy Networks (RPL)", Request for Comments 6552, Mar. 2012, 14 pages, Internet Engineering Task Force Trust.
Thubert P., "An Architecture for IPv6 over the TSCH mode of IEEE 802.15e", 6TiSCH Internet-Draft, <draft-ietf-6tisch-architecture-01>, Feb. 2014, 24 pages, Internet Engineering Task Force Trust.

(Continued)

*Primary Examiner* — Anh Ngoc Nguyen
(74) *Attorney, Agent, or Firm* — Parker Ibrahim & Berg LLC; James M. Behmke; Stephen D. LeBarron

(57) ABSTRACT

In one embodiment, a device determines that a latency between a receive timeslot of a channel hopping schedule of the device and a transmit timeslot of the channel hopping schedule is greater than a latency threshold for a particular traffic flow to be received during the receive timeslot. The device requests an additional transmit timeslot for the channel hopping schedule from a parent node of the device in the network. The device receives an indication of a newly allocated transmit timeslot for the channel hopping schedule from the parent node. The device maps the receive timeslot to one of the transmit timeslots of the channel hopping schedule, wherein the particular traffic flow is to be forwarded to a second device during the mapped transmit timeslot.

21 Claims, 24 Drawing Sheets

(56) References Cited

OTHER PUBLICATIONS

Watteyne, et al., "Using IEEE802.15e TSCH in an IoT context: Overview, Problem Statement and Goals", 6TiSCH Internet-Draft, <draft-ietf-6tisch-tsch-01>, Jul. 4, 2014, 22 pages, Internet Engineering Task Force Trust.

Winter, et al., "RPL: IPv6 Routing Protocol for Low-Power and Lossy Networks", Request for Comments 6550, Mar. 2012, 157 pages, Internet Engineering Task Force Trust.

Vasseur, et al., "Routing Metrics Used for Path Calcuation in Low-Power and Lossy Networks", Request for Comments 6551, Mar. 2012, 30 pages, Internet Engineering Task Force Trust.

Vilajosana, et al., "Minimal 6TiSCH Configuration", 6TiSCH Internet-Draft, <draft-ieft-6tisch-minimal-02>, Jul. 4, 2014, 20 pages, Internet Engineering Task Force Trust.

Rhee, S. et al.: "OSIA Standards & Technology Review Journal," Internet Citation, Sep. 1, 2010, pp. 1-58.

Peng, Du et al.: "Adaptive time slotted channel hopping for wireless sensor networks," Computer Science and Electronic Engineering Conference (CEEC), 2012 4th, IEEE, Sep. 12, 2012, pp. 29-34.

International Search Report dated Oct. 7, 2015 in connection with PCT/US2015/039193.

\* cited by examiner

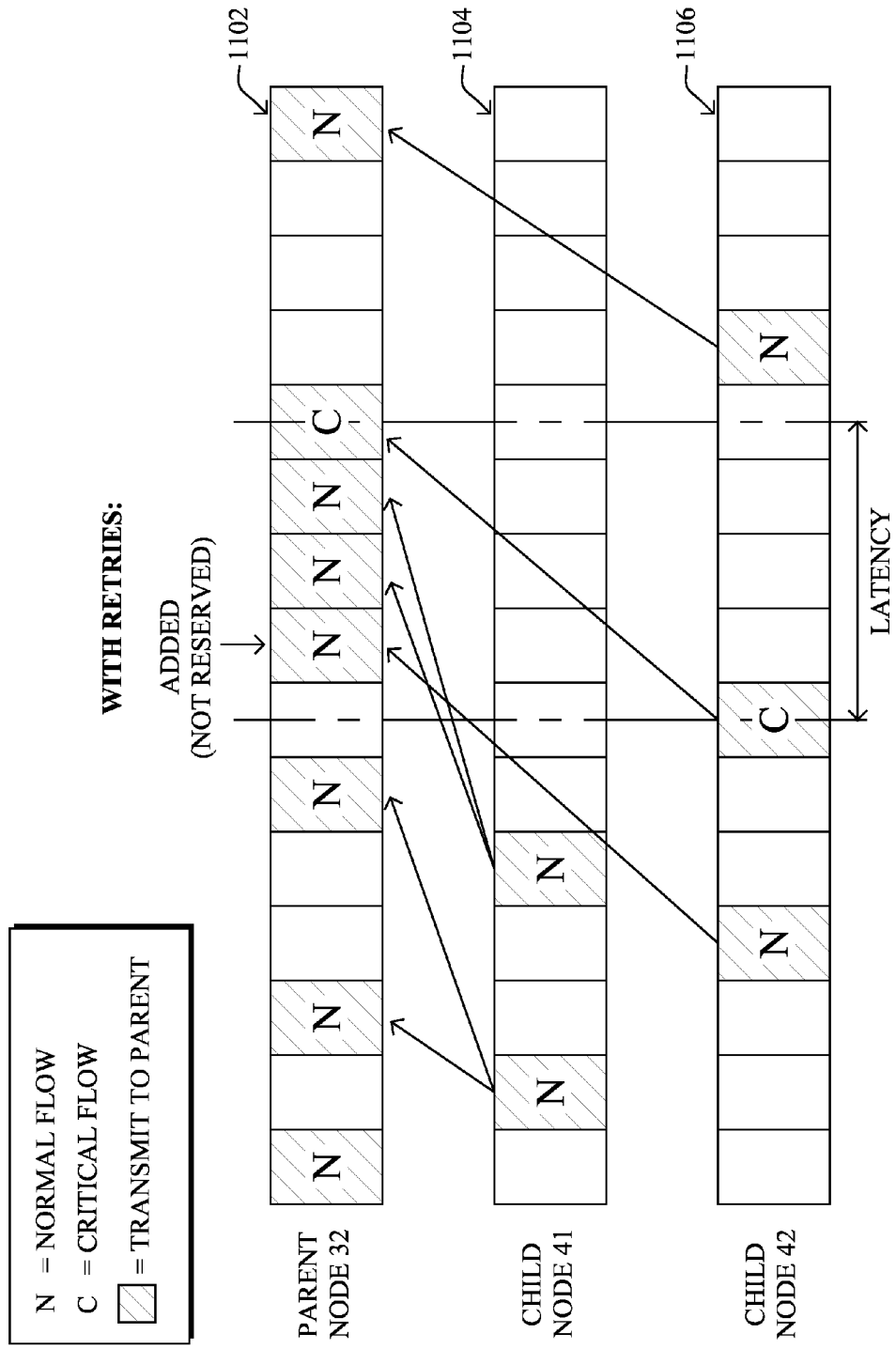

DISTRIBUTED RESCHEDULING OF BOUNDED FLOWS IN A TIME SENSITIVE NETWORK

TECHNICAL FIELD

The present disclosure relates generally to computer networks, and, more particularly, to the distributed rescheduling of bounded flows in a time sensitive network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number of stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 13A-13B illustrate the example communication schedules of FIGS. 11A-11B with an additional transmission timeslot added.

DESCRIPTION OF EXAMPLE EMBODIMENTS

Overview

Figure 1:
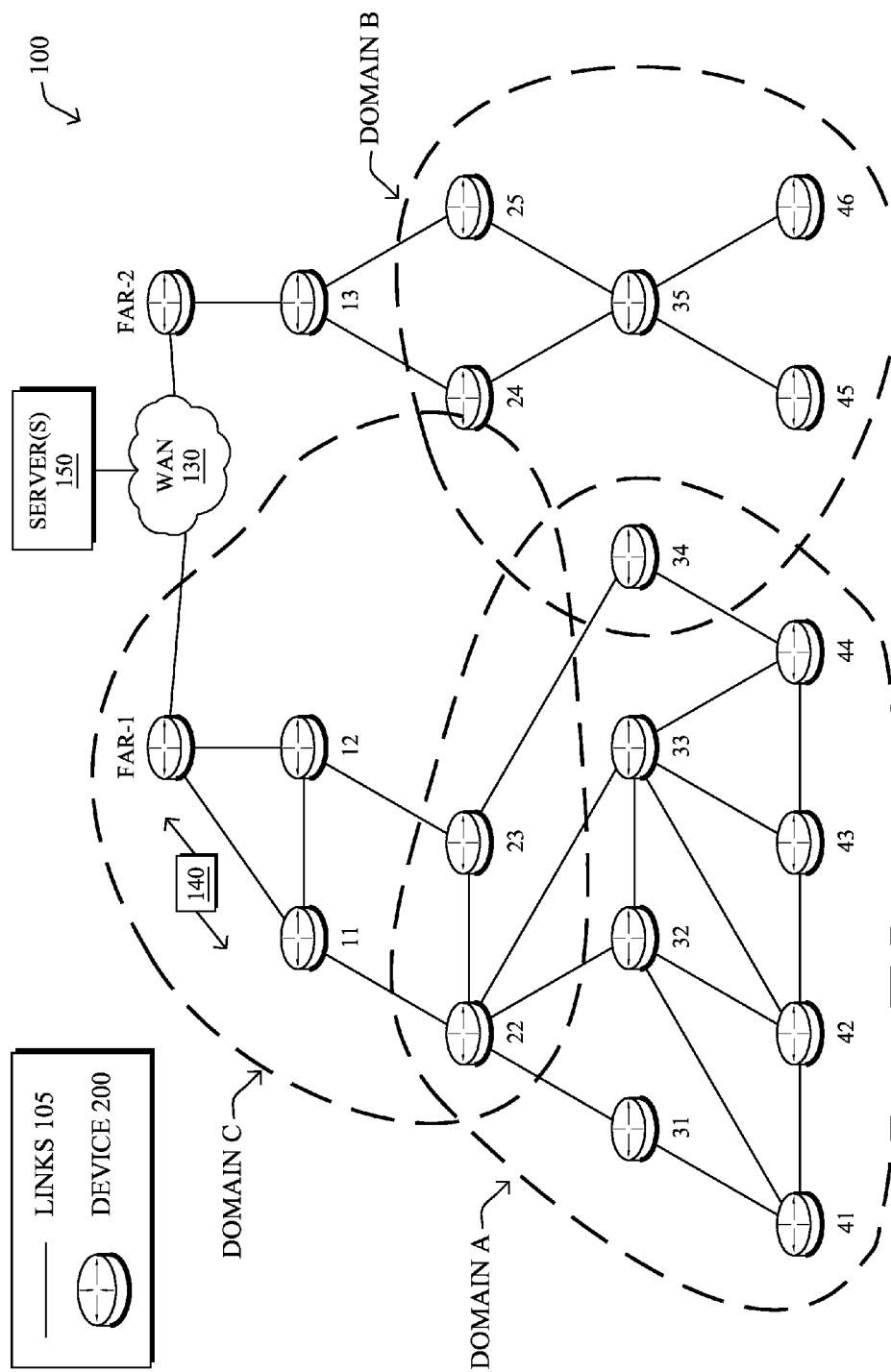
FIG. 1 illustrates an example communication network.

According to one or more embodiments of the disclosure, a device determines that a latency between a receive timeslot of a channel hopping schedule of the device and a transmit timeslot of the channel hopping schedule is greater than a latency threshold for a particular traffic flow to be received during the receive timeslot. The device requests an additional transmit timeslot for the channel hopping schedule from a parent node of the device in the network. The device receives an indication of a newly allocated transmit timeslot for the channel hopping schedule from the parent node. The device maps the receive timeslot to one of the transmit timeslots of the channel hopping schedule, wherein the particular traffic flow is to be forwarded to a second device during the mapped transmit timeslot.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," ... "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

Figure 2:
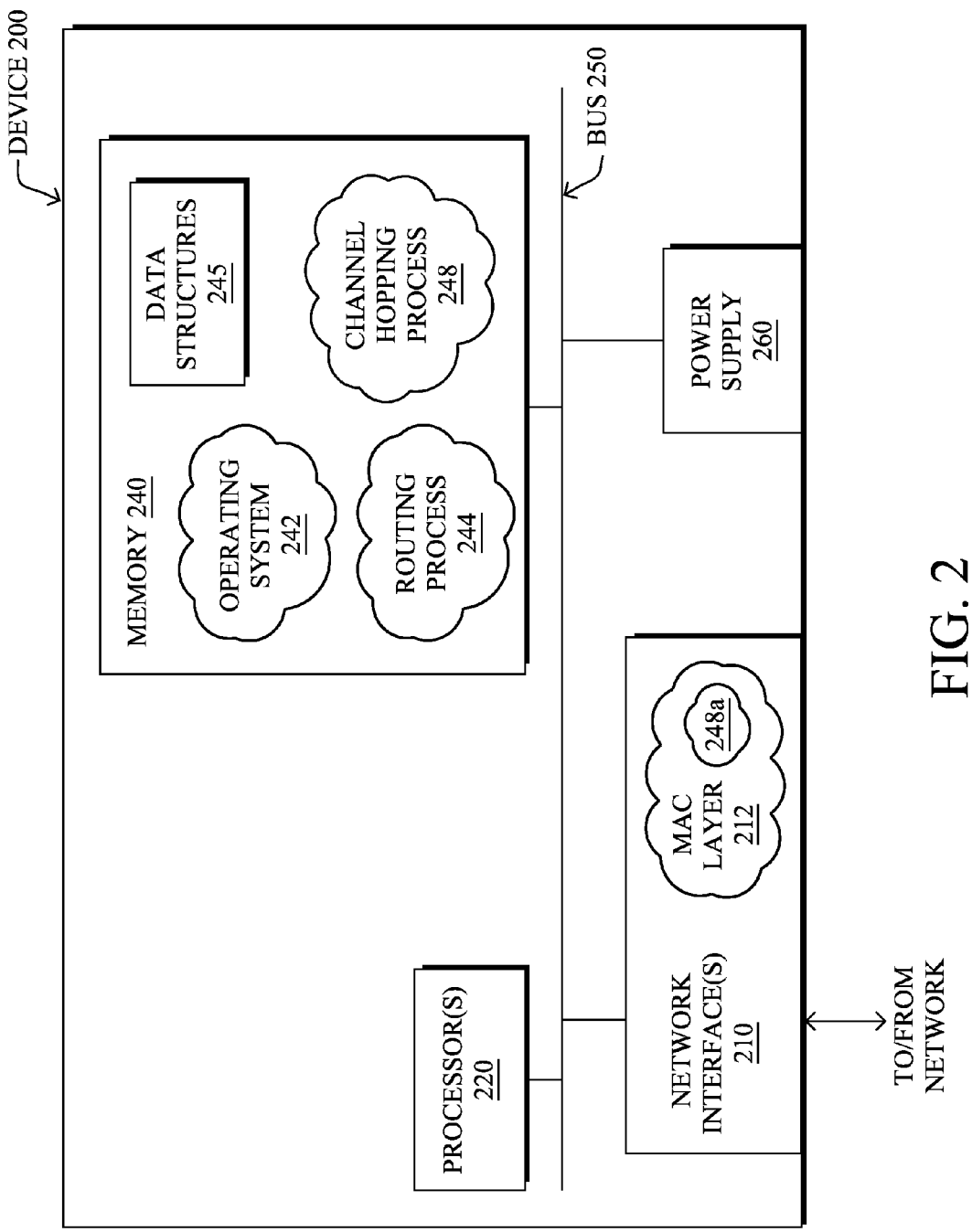
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

According to various embodiments, routing process 244 and/or channel hopping process 248/248a may utilize machine learning techniques, to predict a future state of the network (e.g., predict routing changes, predict timeslot usage by nodes, etc.). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
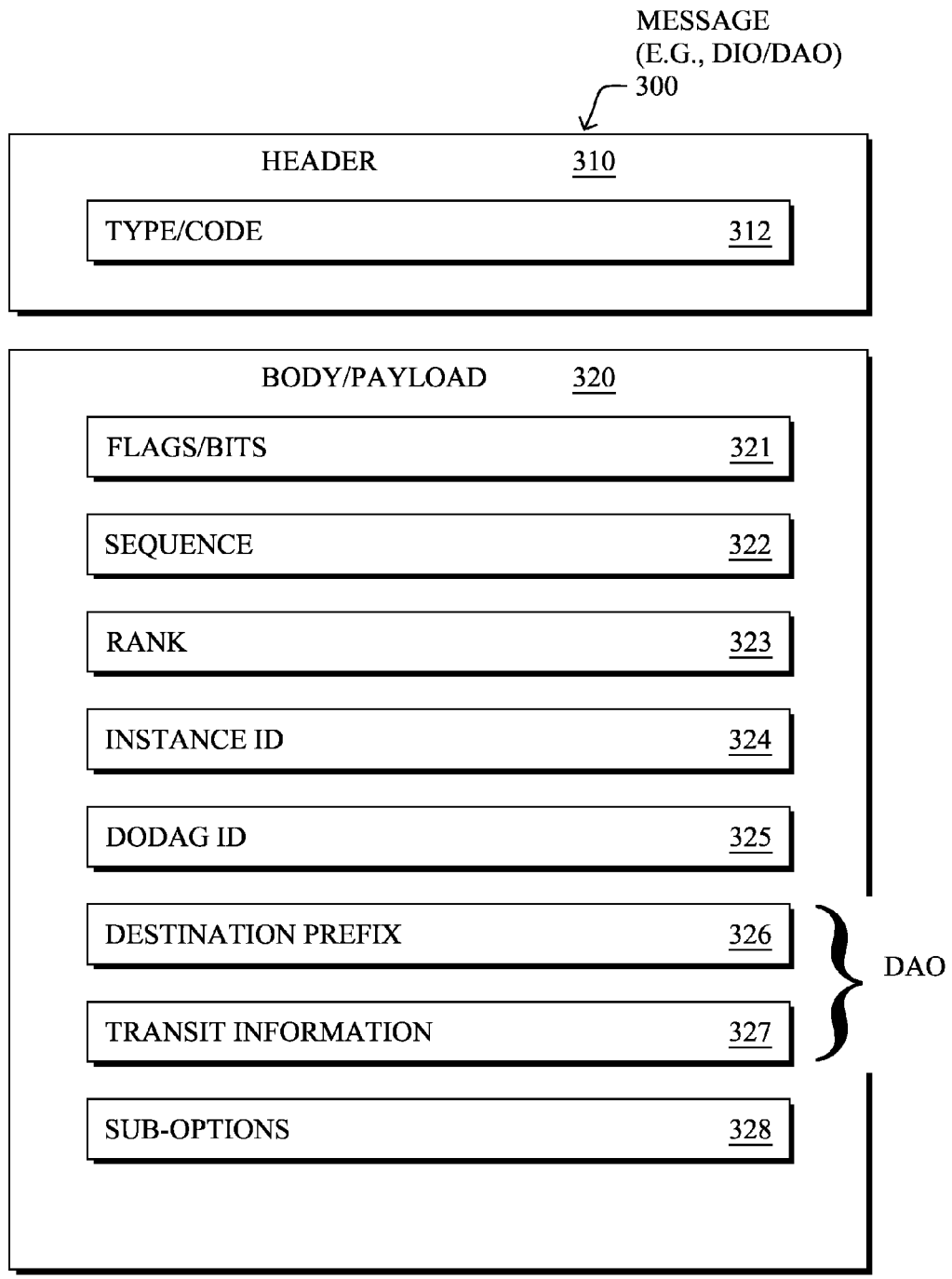
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, suboption fields 328 may be used to carry other certain information within a message 300, such as indications, requests, capabilities, lists, notifications, etc., as may be described herein, e.g., in one or more type-length-value (TLV) fields.

Figure 4:
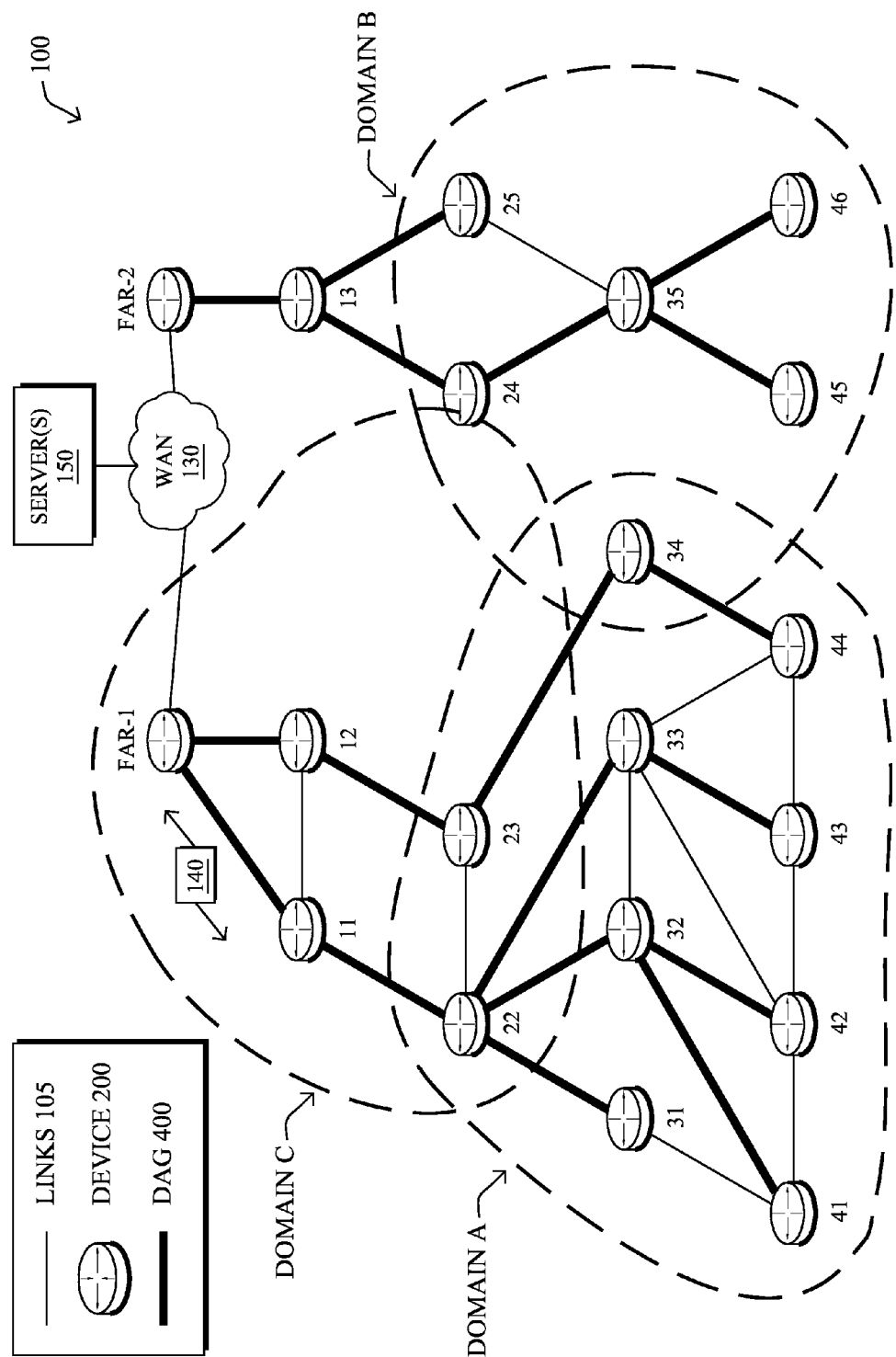
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and timeslots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute timeslots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough timeslots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on timeslotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The timeslotted aspect of the TSCH technology is a time division multiplexing (TDM) technique, which requires all nodes in the network to be time synchronized. In other words, time is sliced up into timeslots with a given timeslot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and timeslots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
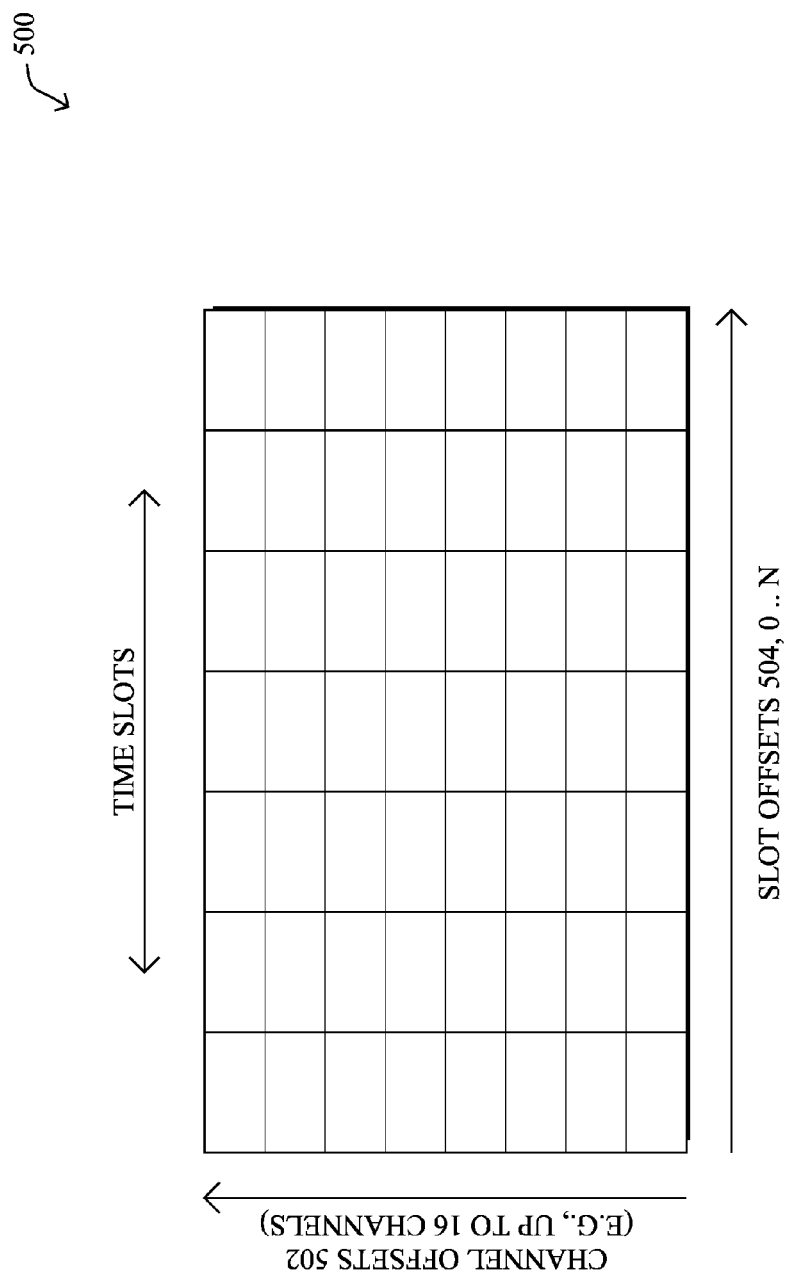
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of timeslots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing timeslots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of timeslots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
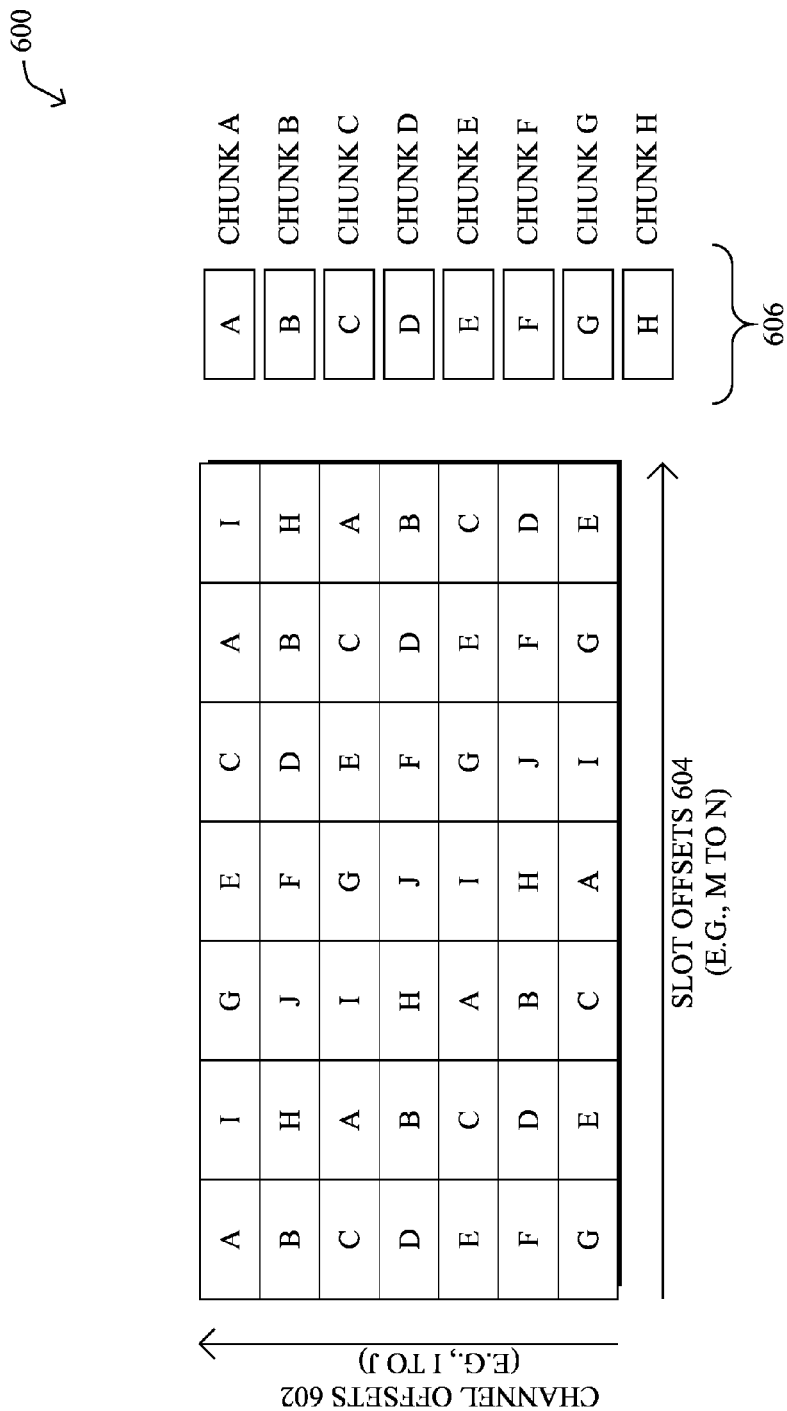
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
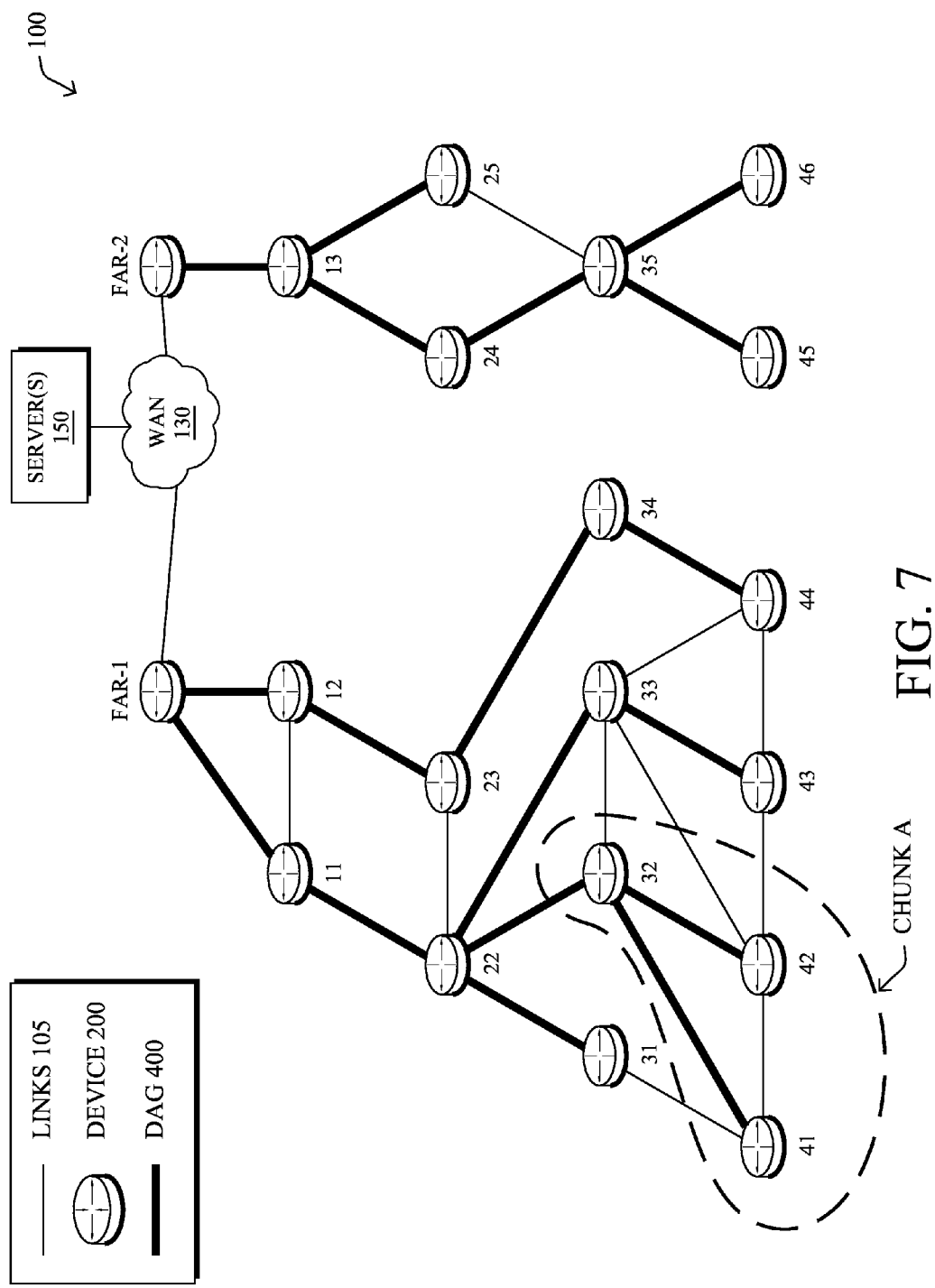
FIGS. 7-8 illustrate examples of a parent node in the network of FIG. 1 scheduling communications for a particular chunk.
Figure 8:
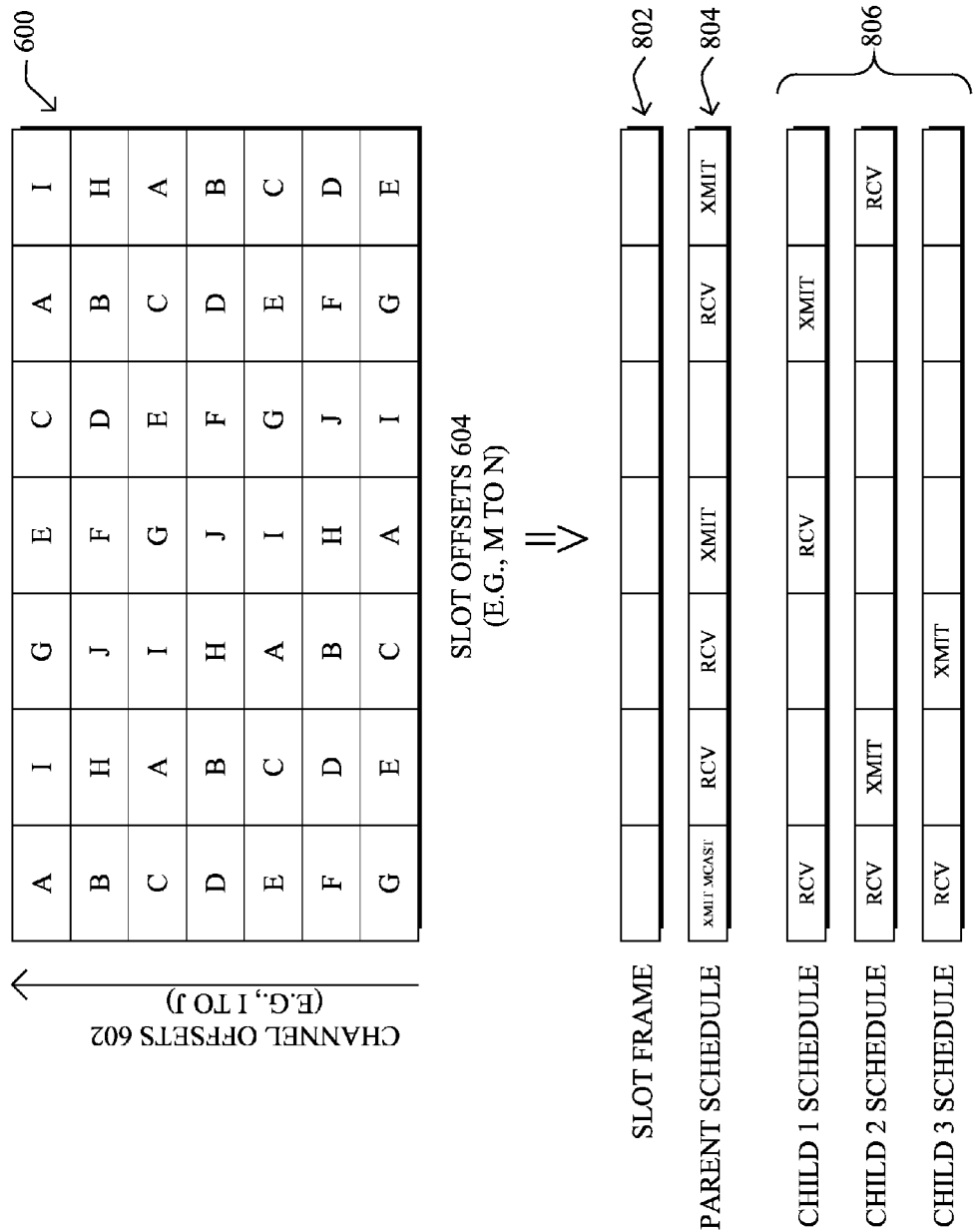

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of timeslots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given timeslot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The timeslots in the slot frame may also be indexed by the slot offsets 604 (e.g., the first timeslot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the timeslots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of timeslots, with a particular timeslot belonging to at most one track. In this model, a set of input cells (timeslots) are uniquely bound to a set of output cells, representing a forwarding state that can be used regardless of the upper layer protocol. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the Track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, some TSCH networks may use a distributed routing protocol (e.g., RPL, etc.) that builds routing topologies in a distributed fashion based on one or more objective functions. In many situations, a distributed routing mechanism may be preferable for use in LLNs and other constrained networks over using a centralized PCE to make routing decisions. Notably, routing operations in RPL may be more efficient than a centralized routing approach, since there is no need for CPU-intensive PCE computations, as well as resilient, since there is no dependence on a PCE for base routing and recovery.

While RPL and other distributed routing protocols are well-suited for LLNs and similar networks, these protocols also lack scheduling mechanisms. Although it is not possible in such protocols to guarantee that an individual path is fully optimized, or that the distribution of resources is globally optimized, it may be possible to impose deterministic behavior along a routing path, such that jitter and latency are tightly controlled.

Distributed Rescheduling of Bounded Flows in a Time Sensitive Network

The techniques herein provide a distributed rescheduling mechanism to reduce the jitter and latency of critical flows in TSCH networks that use distributed routing. In some aspects, flows may be observed, to determine their periodicity and/or criticality. Timeslots may also be allocated that are closer to the arrival time of a critical flow, if a router is unable to satisfy the delay and/or jitter requirements of the flow. In another aspect, a mapping between an input timeslot associated with the critical flow (e.g., a receive timeslot in which the flow is received) and an output timeslot of a router (e.g., a transmit timeslot in which the flow is forwarded) may be locked. In further aspects, timeslots may also be de-allocated based on observations regarding their use by a router.

Specifically, according to one or more embodiments of the disclosure as described in detail below, a device determines that a latency between a receive timeslot of a channel hopping schedule of the device and a transmit timeslot of the channel hopping schedule is greater than a latency threshold for a particular traffic flow to be received during the receive timeslot. The device requests an additional transmit timeslot for the channel hopping schedule from a parent node of the device in the network. The device receives an indication of a newly allocated transmit timeslot for the channel hopping schedule from the parent node. The device maps the receive timeslot to one of the transmit timeslots of the channel hopping schedule, wherein the particular traffic flow is to be forwarded to a second device during the mapped transmit timeslot.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Operationally, a distributed mechanism is disclosed for optimizing the latency of critical traffic flows in either direction between a node in a TSCH/distributed routing network and the root of the network. In one embodiment, the network is a 6TiSCH network that uses RPL as its routing protocol. As noted above, the communication schedules of child devices in such a network may be set by a parent node of those devices. In some embodiments, the parent node may locally re-arrange the slots for the downwards direction, in order to reduce the latency of traffic going downwards, from the root to the child nodes. For upward traffic that comes from the child nodes, visibility may also be granted to the parent node, allowing any service level agreements (SLAs) associated with a flow to be met.

In various embodiments, a router may identify which traffic flows are both critical and periodic. As used herein, a critical traffic flow generally refers to any traffic flow that has a set of one or more associated delivery parameters (e.g., a bounded amount of delay along a network path, a bounded amount of jitter along the path, a priority value, etc.). For example, videoconference traffic may be critical, since excessive jitter or delay in the traffic may impact the user experience. The notion of a critical traffic flow may also be expanded in the context of deterministic networking, whereby delivery times of packets may be strictly controlled.

Figure 9A:
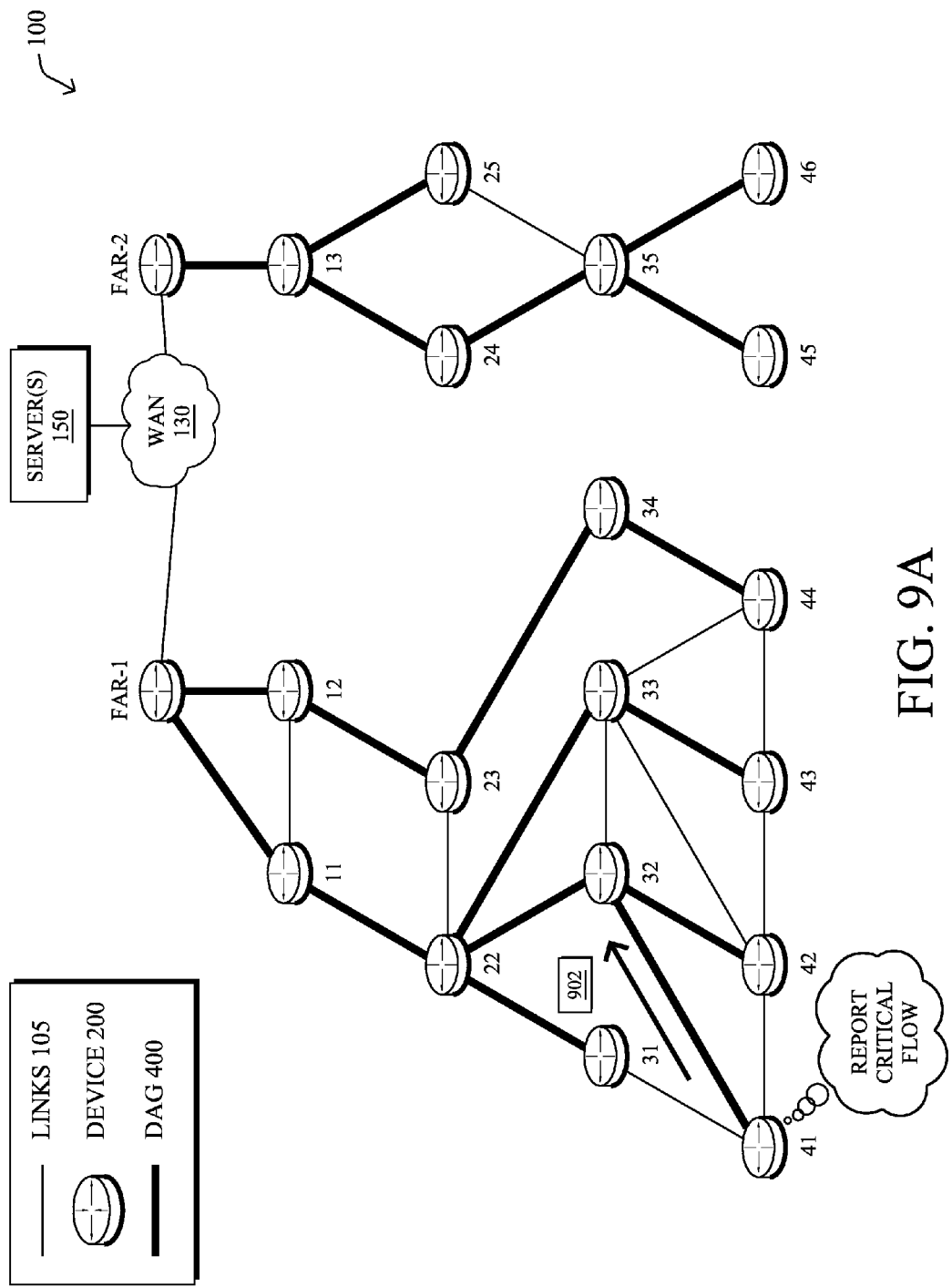
FIGS. 9A-9D illustrate an example of a critical traffic flow being identified.

In one implementation, a child node may notify a parent node as to the criticality and/or periodicity of a particular traffic flow. For example, as shown in FIG. 9A, child node 41 may send a notification 902 to its parent node 32 that identifies the criticality and/or periodicity of a traffic flow to be sent from node 41. Notification 902 may be, in one embodiment, a customized 802.15.4e information element (IE) that may also include a packet tag for the flow. Such a tag may then be used by node 32 to associate an incoming traffic flow with its corresponding criticality and/or periodicity, accordingly.

Figure 9B:
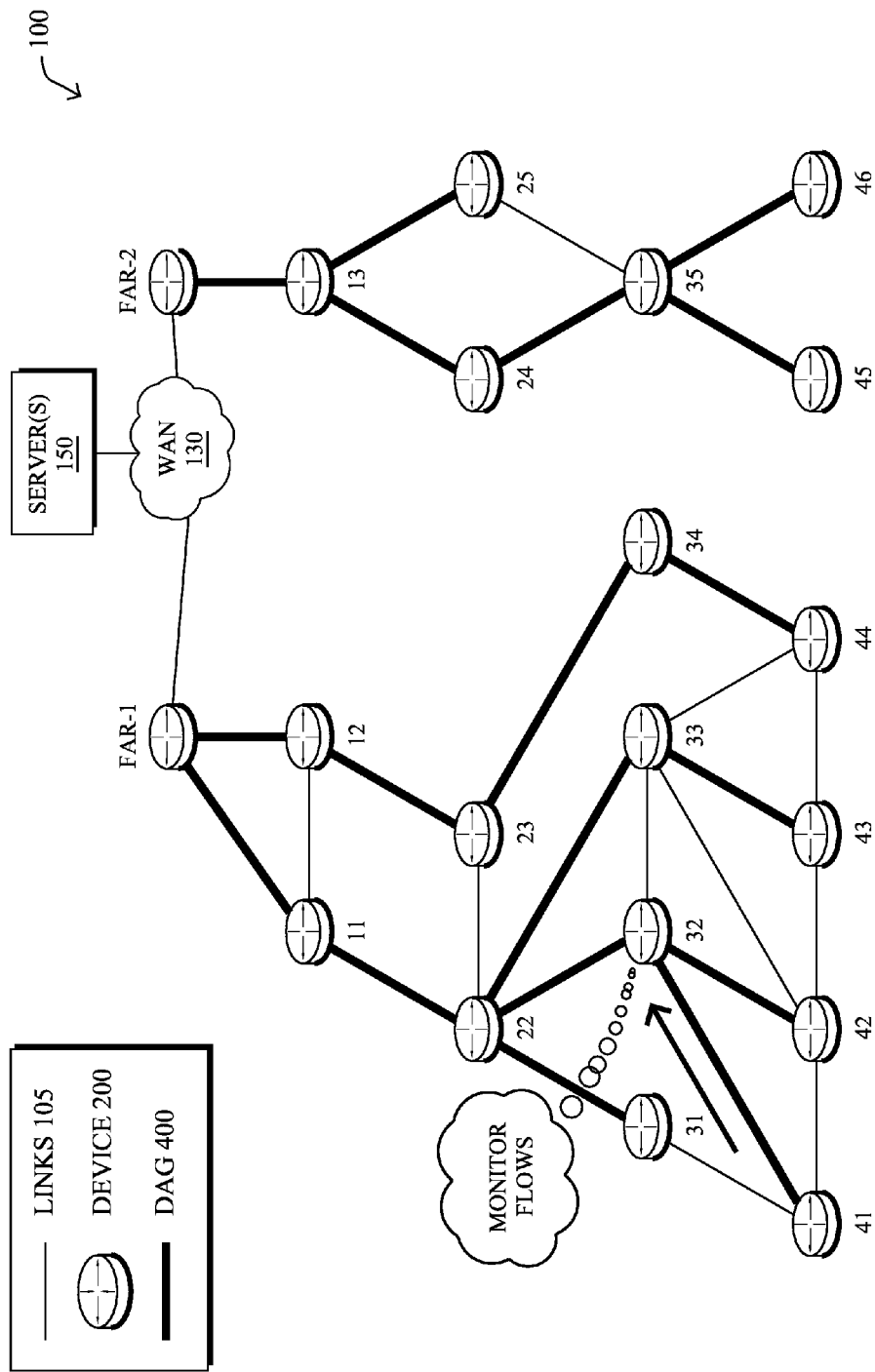
Figure 9C:
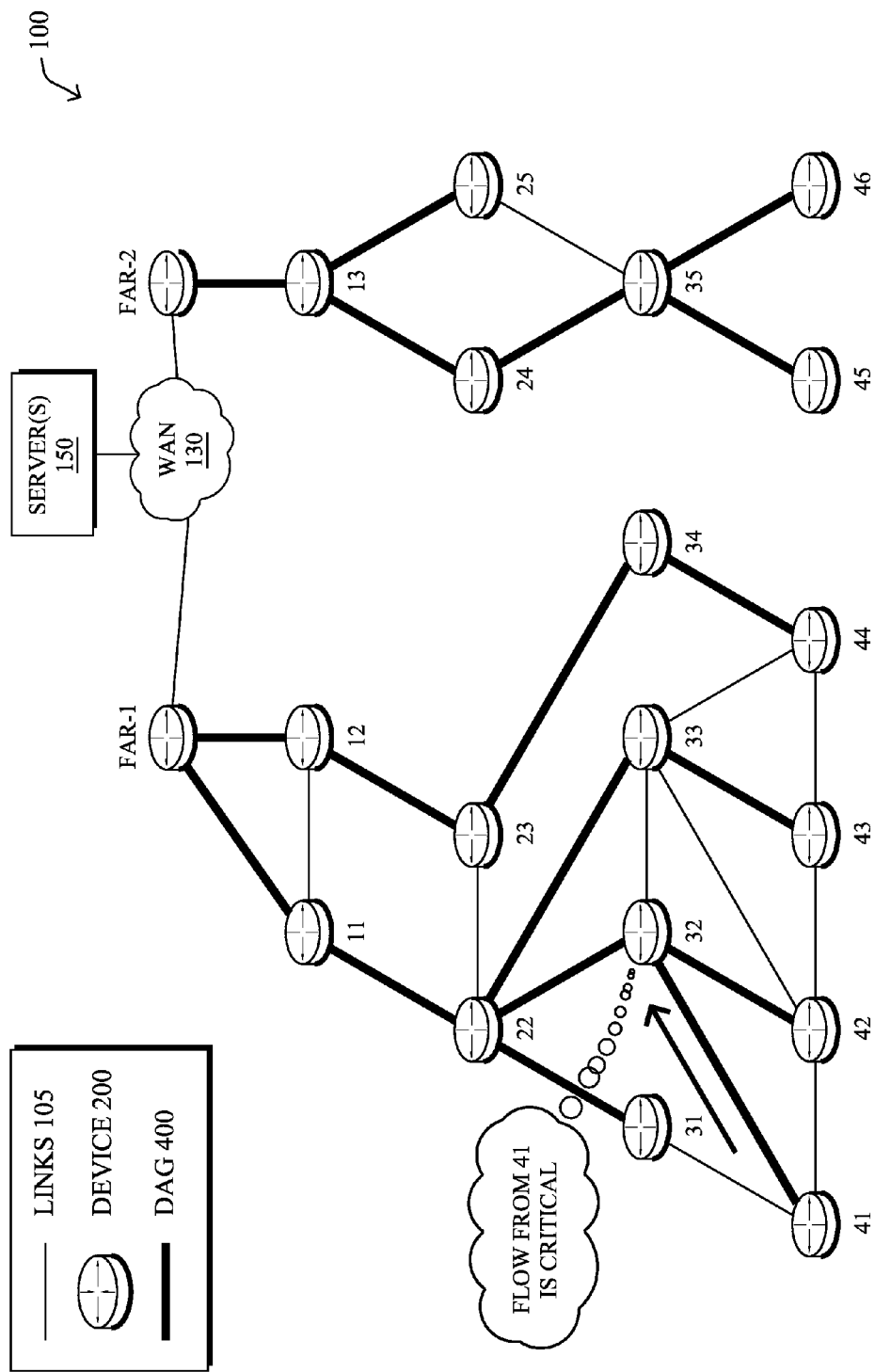
Figure 9D:
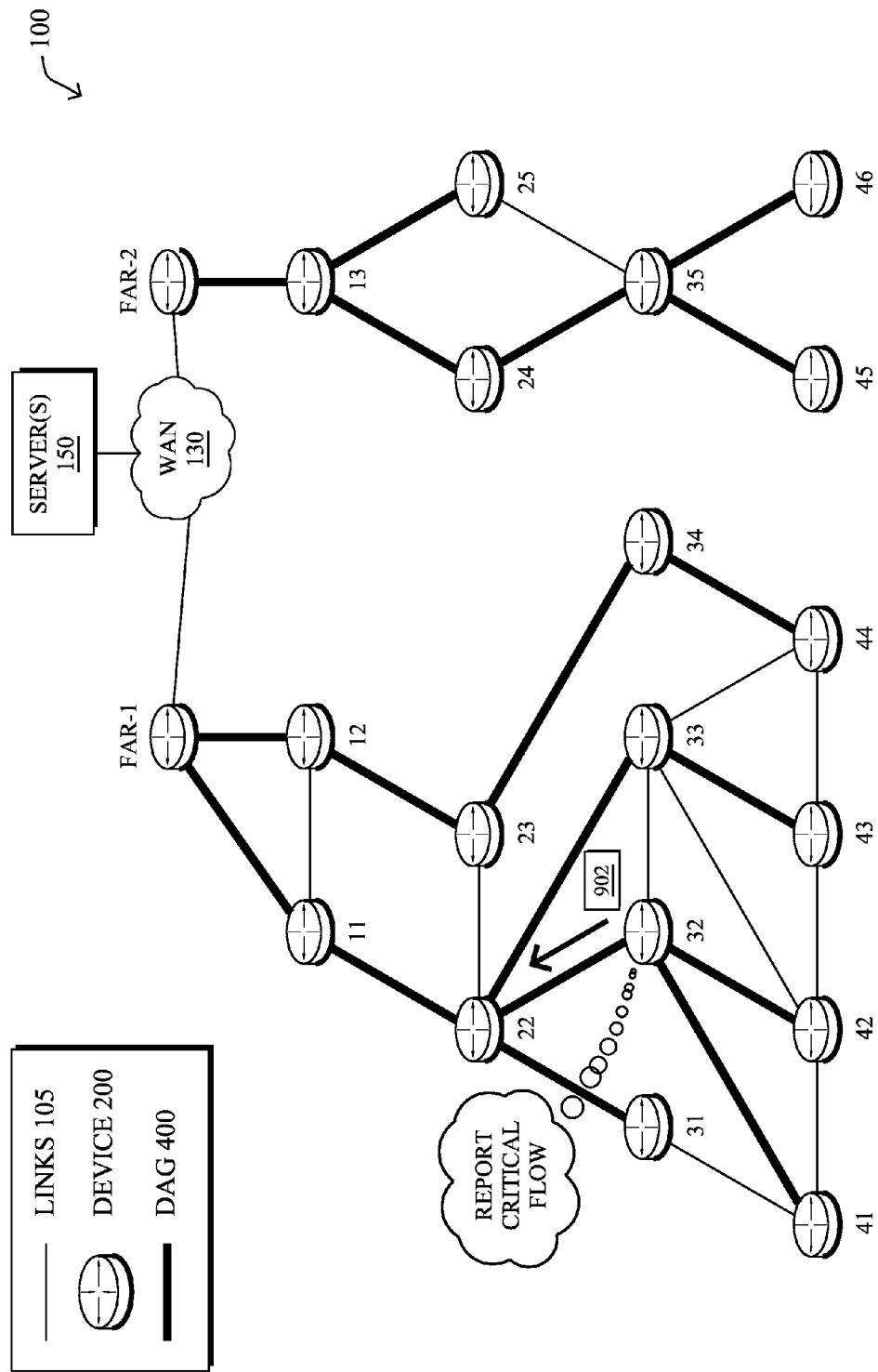

In other implementations, a parent node may itself determine the criticality and/or periodicity of a traffic flow. For example, a router may maintain a statistic regarding traffic flows received in a particular timeslot, to determine the periodicity of the flow. In some cases, the periodic nature of a given flow may be determined using time-series modeling, to detect the traffic patterns including the seasonality of specific flows. If a traffic flow is effectively received on a timely basis, and some metadata such as a DSCP in the packet indicates that the flow is time-sensitive, then the router may determine that the flow is both critical and periodic, as illustrated in FIGS. 9B-9C. In such cases, the router may also inform the next hop router directly regarding the criticality and periodicity of the flow. For example, as shown in FIG. 9D, node 32 may send notification 902 to its parent node 22 in a manner similar to that discussed above with respect to reporting this information directly.

Figure 10A:
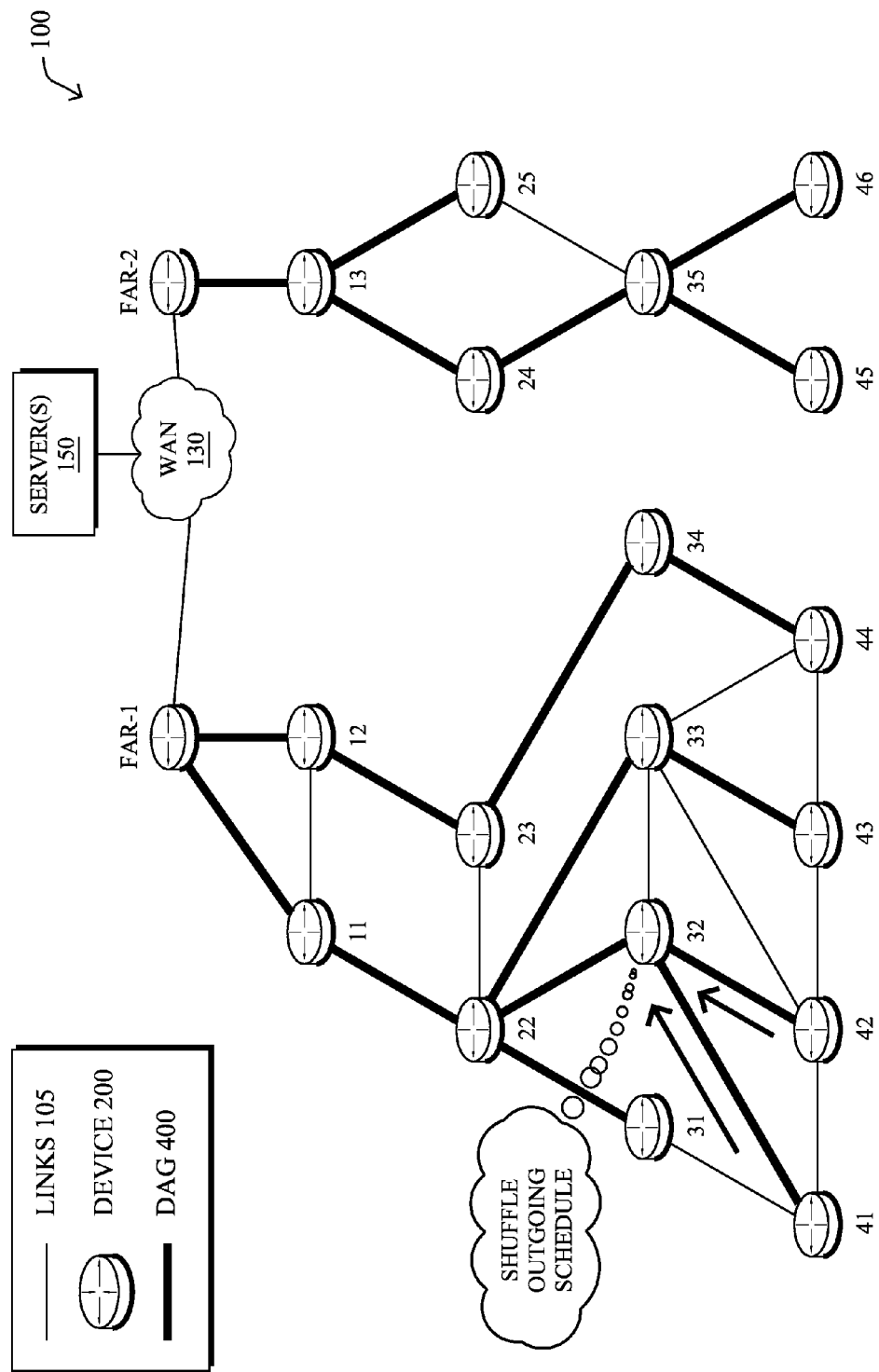
FIGS. 10A-10B illustrate an example of the forwarding of a critical traffic flow being scheduled.
Figure 10B:
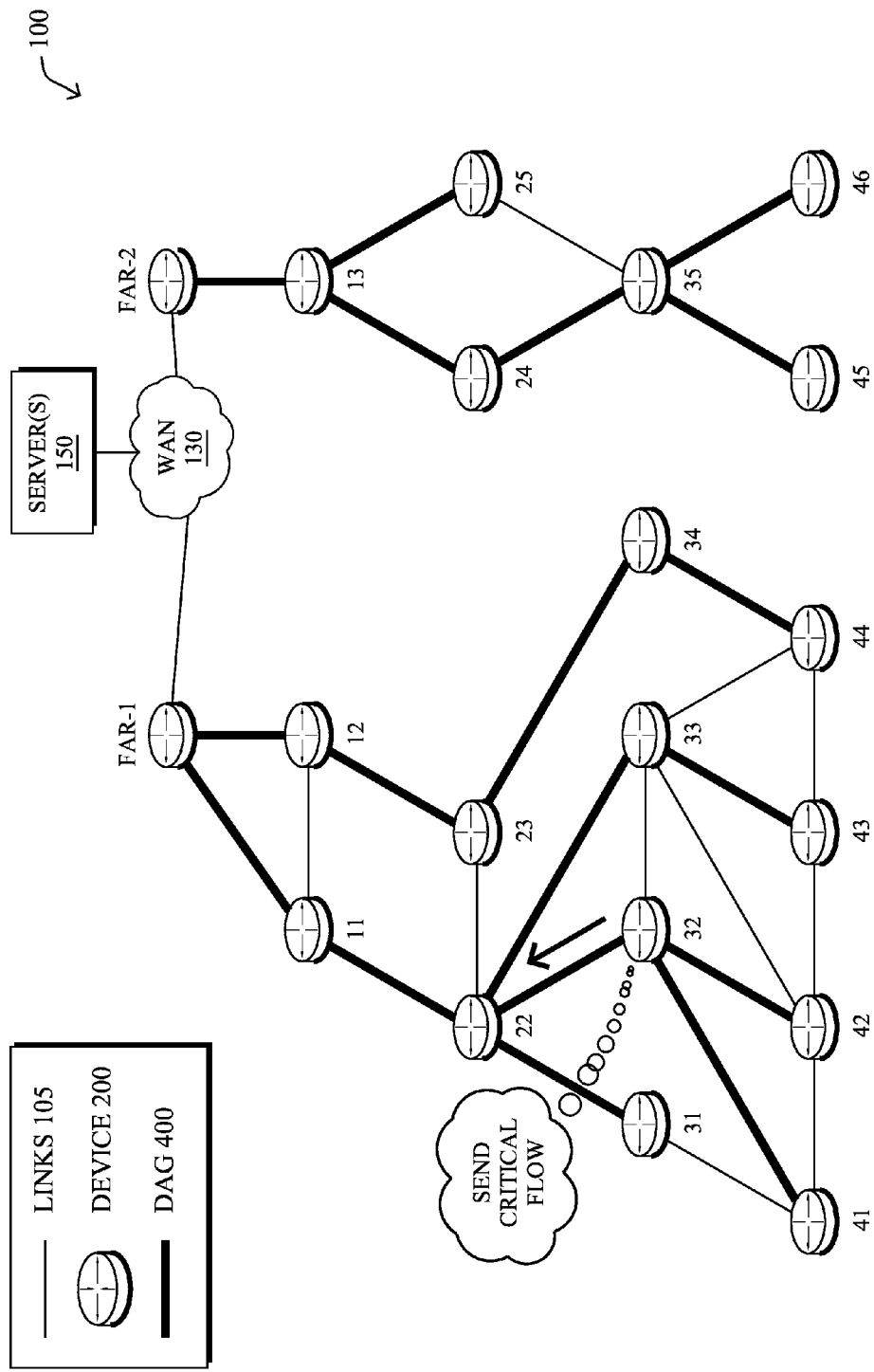

Referring now to FIGS. 10A-10B, a router may determine locally whether it can associate an incoming timeslot in which a time-sensitive packet is received with an outgoing timeslot to the next hop router by reshuffling the timeslots that it already uses to communicate with the next hop. For example, as shown in FIG. 10A, assume that a packet of a critical traffic flow is received by node 32 from node 41 during an inbound/receive time slot of the TSCH schedule of node 32. In such a case, node 31 may attempt to rearrange the mapping between its inbound/receive timeslots and its outbound/transmit timeslots used to forward packets to node 22, to accommodate the requirements of the critical traffic flow from node 41. If a flow is not jitter sensitive then, at every round of the slotframe, the router picks an upcoming timeslot that is acceptable for that flow with the expected per-hop latency and maps the two timeslots for that round.

Figure 11A:
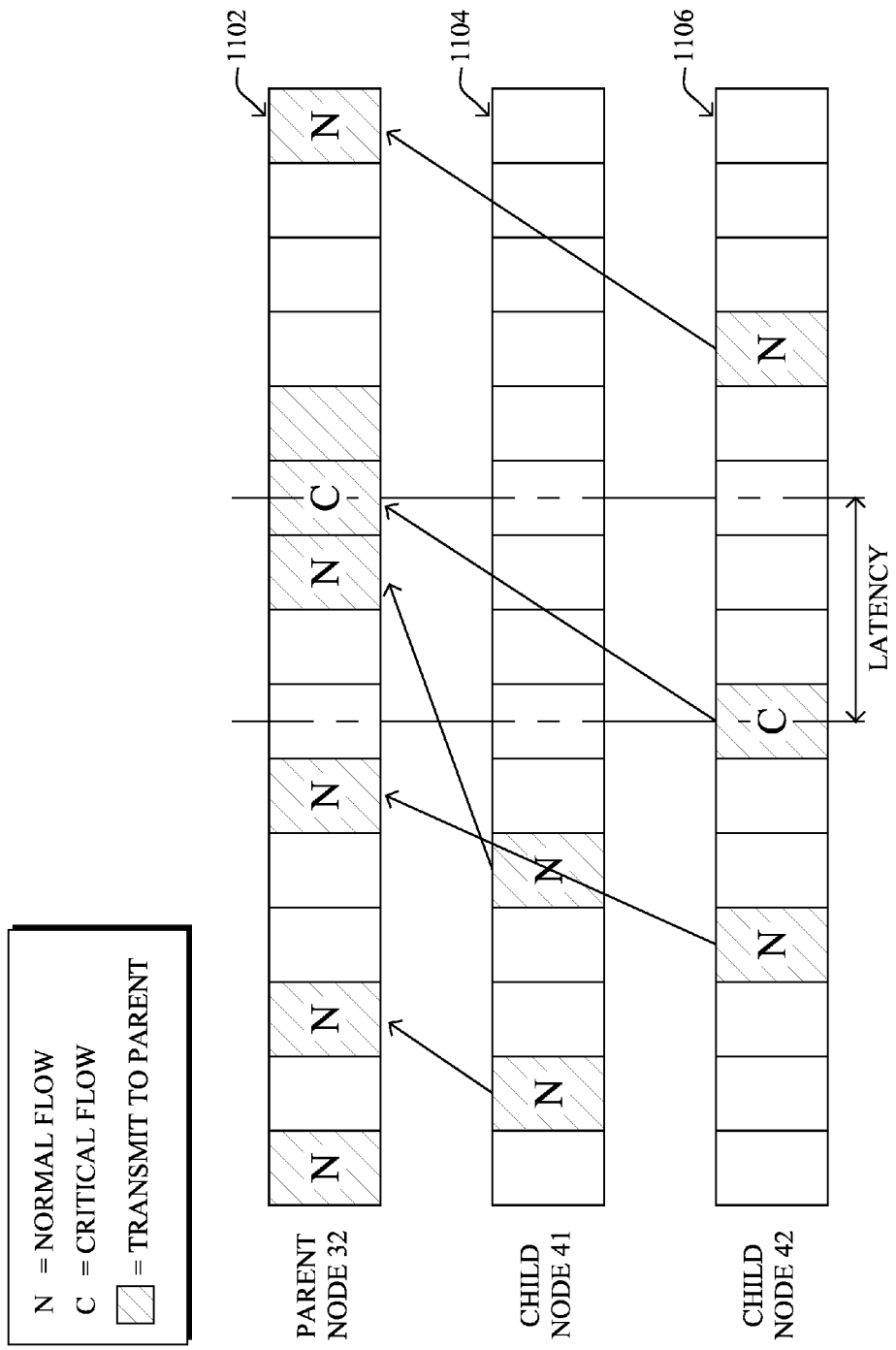
FIGS. 11A-11B illustrate example communication schedules.
Figure 11B:
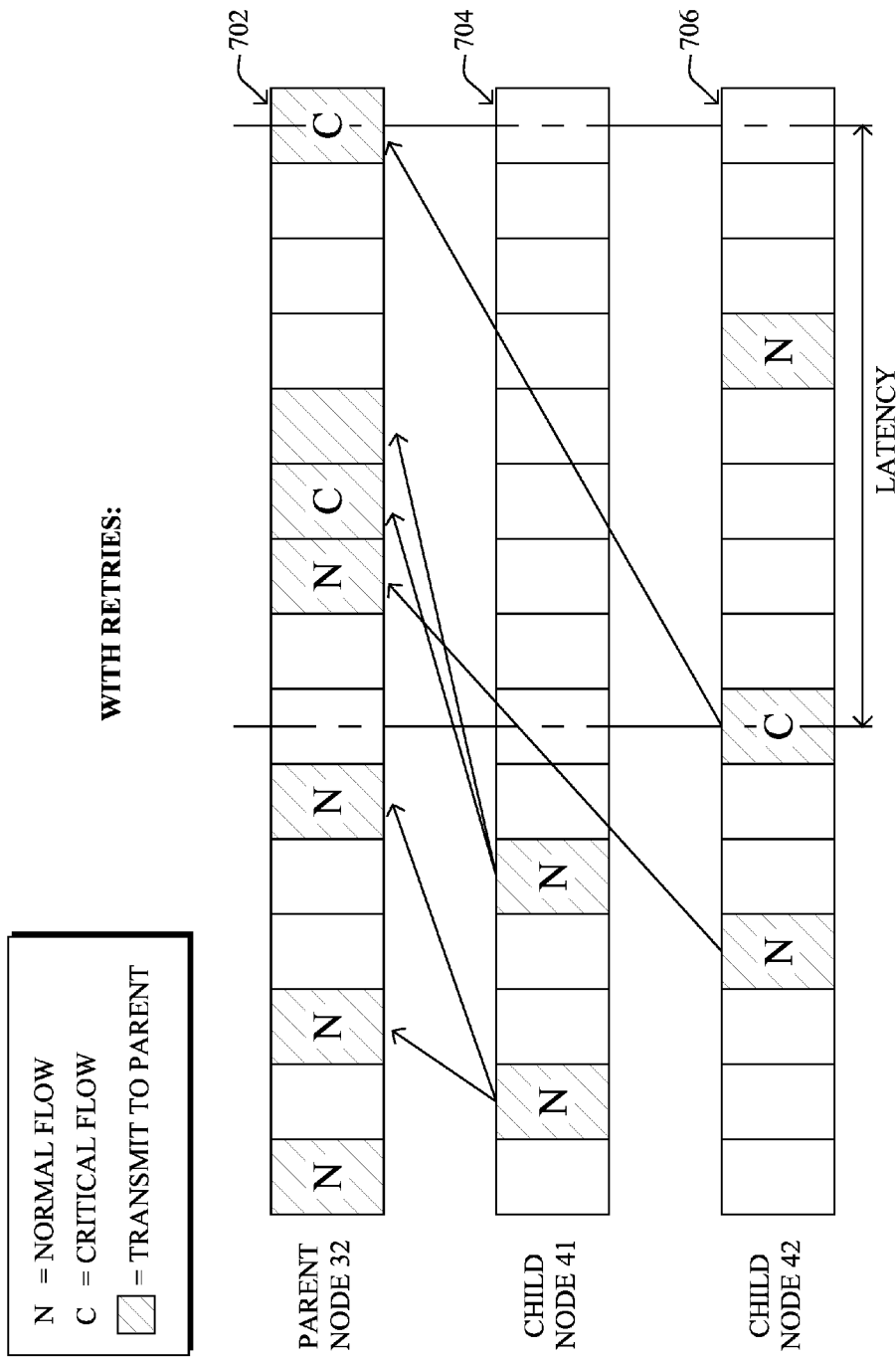

Referring now to FIGS. 11A-11B, example communication schedules 1102-1106 for nodes 31 and its respective child nodes 41-42 are shown. As shown, certain timeslots (e.g., cells) of the CDU matrix may be assigned as transmit/receive pairs in which a given node may transmit data to its parent node. For example, parent node 32 as a chunk owner may allocate a particular timeslot to node 41 during which node 41 may transmit data and parent node 32 may listen for receptions from node 41.

When parent node 32 receives a packet to be forwarded (e.g., to its own parent node 22) in a particular inbound timeslot, parent node 32 may attempt to map the inbound timeslot to one of its own outbound timeslots associated with the next hop (e.g., a transmit timeslot in which node 32 may send data to node 22). Thus, the overall latency associated with the forwarding action may correspond to the time difference between the inbound and outbound timeslots used by node 32 for a particular traffic flow. For example, as shown in FIG. 11A, inbound and outbound timeslots may be mapped by node 32 such that a packet of a critical traffic flow (denoted "C") has a latency that corresponds to three timeslots.

In some implementations, an IE may be used between nodes to indicate the per-hop (e.g., expected) latency for a traffic flow. This per-hop latency may be viewed as a delay budget for the receiving router between the inbound and outbound times of a flow packet. In other words, the specified per-hop latency may provide a maximum bound for the router to map the inbound timeslot for the frame to an outbound timeslot. For example, assume in FIG. 11A that the per-hop latency for critical flow C corresponds the length of four timeslots. Thus, as shown, the mapping between the inbound timeslot and outbound timeslot for flow C may satisfy this latency requirement.

In addition to a per-hop latency, an IE may specify a path latency credit value for the path latency that credits/debits latencies across different router hops. For example, a packet may obtain a path latency credit if it is forwarded by a router faster than the specified per-hop latency. Conversely, the value may be debited if the current router is unable to meet the per-hop latency. Notably, both the per-hop latency and the path credit value may be used by the router for purposes of mapping incoming and outgoing timeslots for a flow.

When a timeslot is selected for the future forwarding, the latency and resulting path credit may be stamped in the selected upcoming slot, and the frame may be attached to the outgoing slot for transmission. If another time sensitive frame, arriving later but prior to the time of the mapped outgoing timeslot also needs that timeslot, then the router may use the path credits associated with each flow to arbitrate which flow is assigned the outgoing timeslot. For example, the router may assign the outgoing timeslot to one of the flows based on their respective per-hop latencies or their path credits (e.g., to provide both flows with a path credit at the time the frames are transmitted, or at least to minimize the worst resulting debit among the frames). At forwarding time, the per-hop latency and path credit may be placed in an IE with the frame and the process continues.

In general, a path credit may be a signed integer that is initially set to 0. The per-hop latency is the overall acceptable latency for that flow along the path divided by the number of hops. If a hop consumes less than the per-hop latency, the credit is incremented by the difference. Conversely, the credit is decremented if the latency in a node exceeds the per-hop latency. In another embodiment, the per-hop latency may be a well-known function of the depth, with typically a larger per-hop latency for a node that is closer to the root.

Despite the above mapping mechanism, there may still be cases in which the mapping would result in a latency that is unacceptable for a particular traffic flow. For example, assume in FIG. 11B that retries are enabled in which a dropped packet may be retransmitted during a subsequent timeslot. As shown, the retries may be such that the sending of the critical packet is pushed out until a later timeslot, leading to an unacceptable amount of latency for the packet.

Figure 12A:
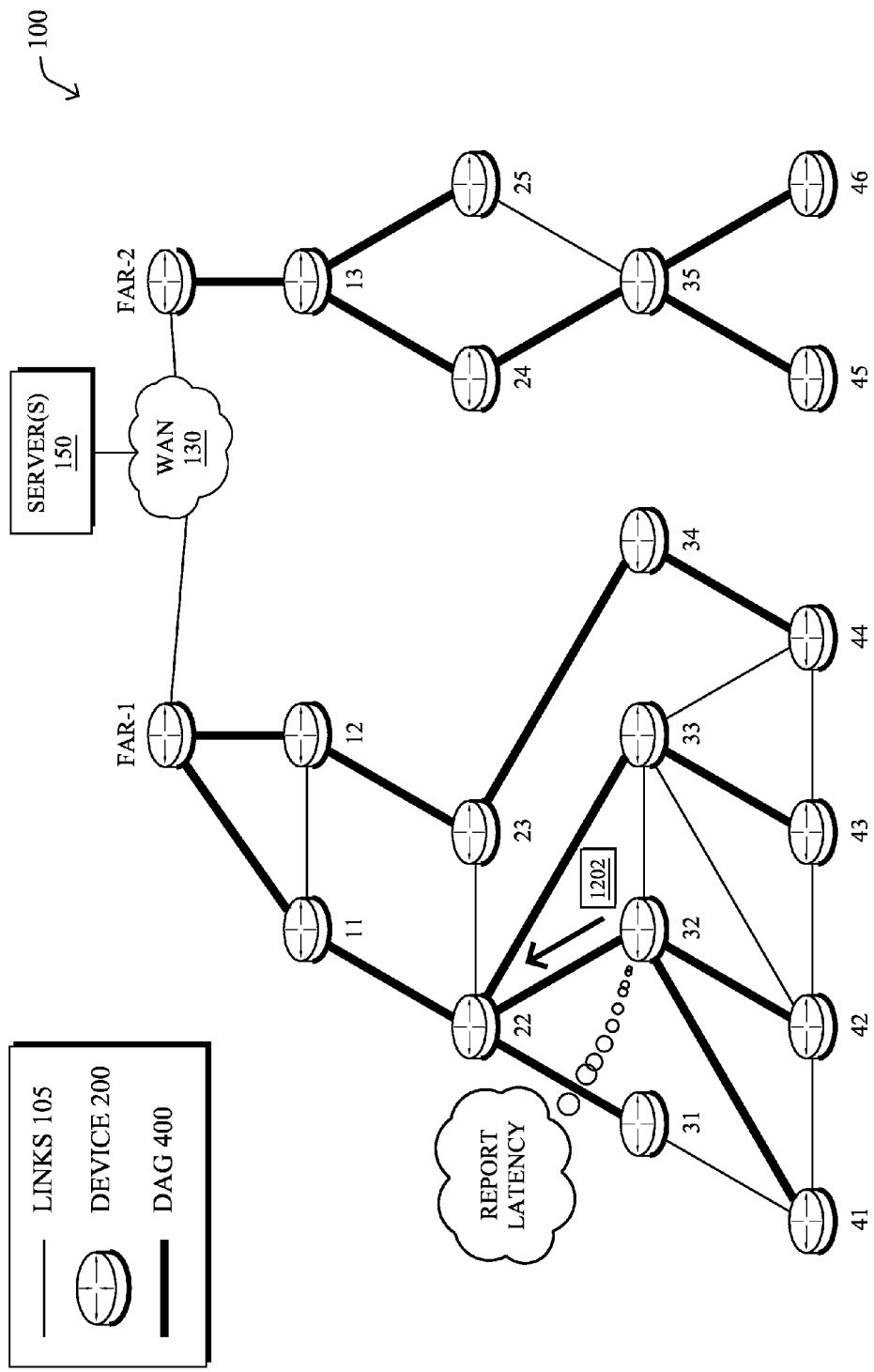
FIGS. 12A-12B illustrate an example of an additional timeslot being requested.
Figure 12B:
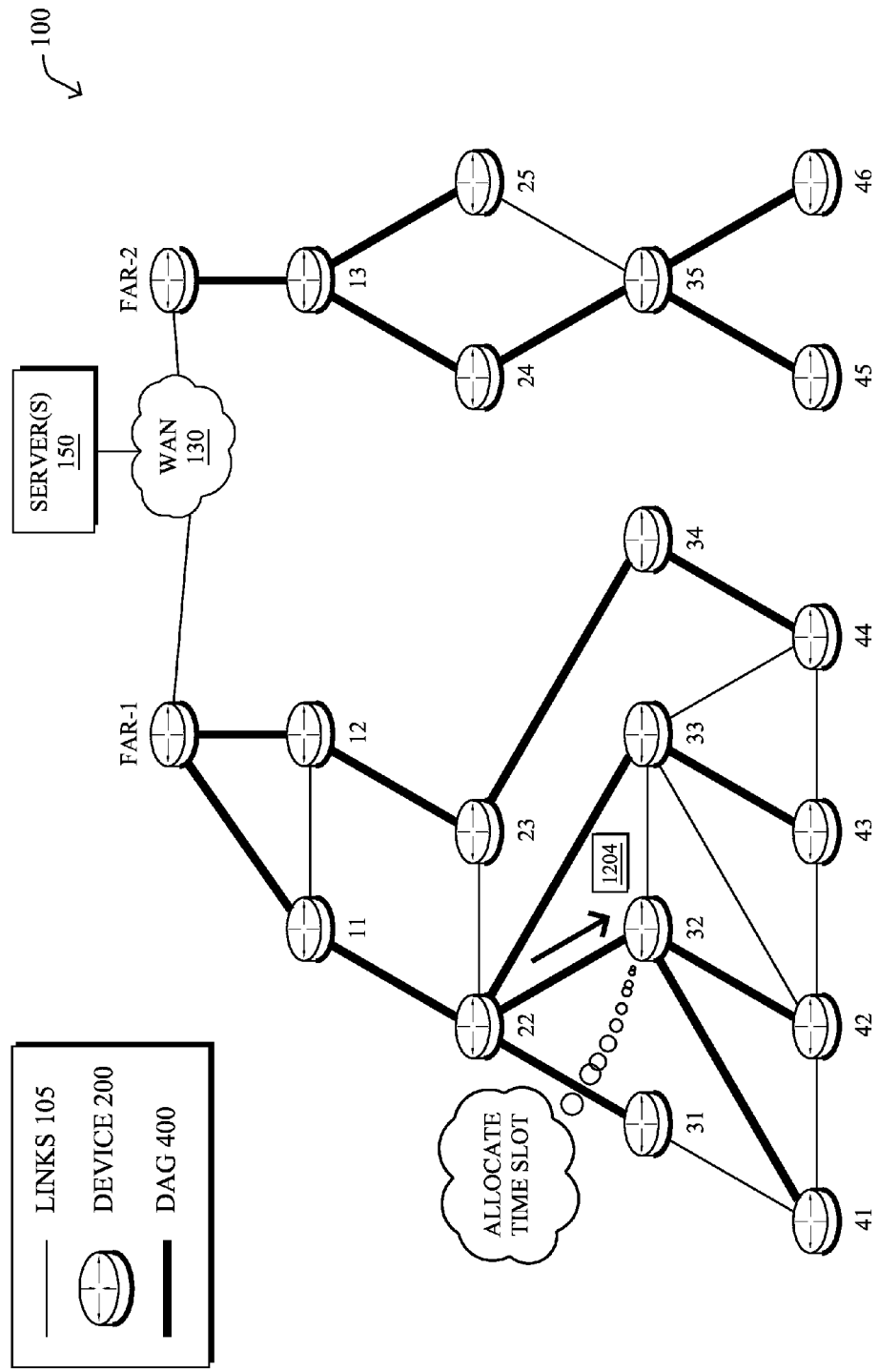

According to various embodiments, a global optimization mechanism is disclosed that may reduce the latency of critical and periodic flows by allocating new timeslots dynamically and reorganizing communication schedules across multiple routing hops. In some embodiments, an outgoing timeslot may be added to the bundle that represents the outgoing link. The new timeslot may be selected as close as possible to the arrival timeslot, so as to incur a minimum amount of latency as possible. As noted above, a parent of a given node may be responsible for assigning a communication schedule to the node (e.g., via an IE). Thus, for downward flows in which a node forwards packets to one of its child nodes, the parent node may simply add a transmit timeslot to its own schedule and push a corresponding receive timeslot to the receiving child node. However, for upward flows flowing towards the root of the network, the node may instead notify its own parent of its need for a new timeslot. For example, as shown in FIG. 12A, node 23 may send a message 1202 to its parent node 22 that reports a forward latency condition and requesting allocation of an additional timeslot that is closer in time to the inbound timeslot for the corresponding flow. In response, as shown in FIG. 12B, parent node 22 may send an updated communication schedule 1204 to node 32, to add a transmit timeslot to the schedule of node 32.

Figure 13B:
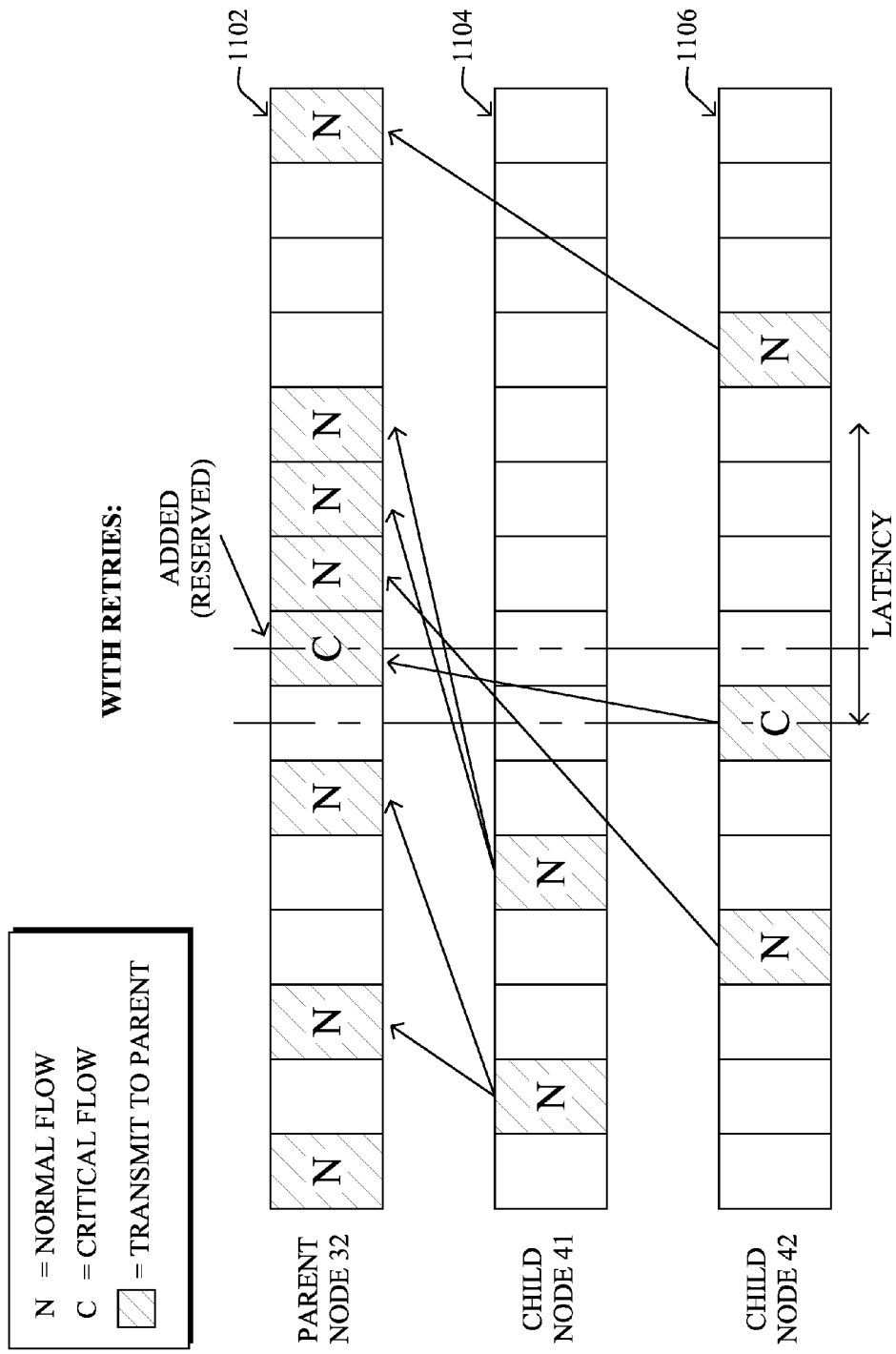

Referring now to FIGS. 13A-13B, the example timeslots of FIGS. 11A-11B are shown with an additional transmission timeslot added to timeslot 1102 of node 32. For example, node 32 may receive an additional outbound timeslot from its parent node 22. In one embodiment, as shown, the unused timeslot that occurs closest in time after the inbound timeslot for the critical flow may be selected and added to the schedule of node 32. In doing so, the forwarding latency of the critical flow may be reduced in comparison to that shown in FIG. 11B.

In various cases, the mapping between an inbound and outbound timeslot for a particular traffic flow may be locked or unlocked. In the case shown in FIG. 13A, this means that the inbound timeslot for the critical flow may be mapped to any available outbound timeslot. However, as shown in FIG. 13B, the inbound timeslot may alternatively be "locked" to the newly allocated outbound timeslot, thereby shifting the sending of other, less critical flows, to later timeslots. A locked mapping between inbound and outbound timeslots may also be carried forward to periodic uses of the respective timeslots. In other words, if packets of the critical flow are received in the same timeslot periodically, the packets may also be sent in the same periodic outgoing timeslots.

Locking a mapping between an inbound and outbound timeslot may help to reduce jitter for the flow and may be of particular use with jitter sensitive flows that use the same input timeslot consistently (e.g., on a periodic basis relative to the communication schedule). When a lock is initiated, the outbound timeslot may be subsequent to the inbound timeslot. However, if the mapping for an inbound timeslot is unlocked, then the new timeslot may be chosen around the inbound timeslot, either before or after. If it is placed before the time of arrival, the effect is to absorb traffic that would have been queued prior the particular timeslot and would have delayed its transmission. For example, assume that there are two incoming timeslots in a row, the second slot being time sensitive, and there are also two outgoing slots. In such a case, the second flow may be delayed until the second outgoing slot. However, if another outbound timeslot is added after the first incoming slot, this will effectively reduce the latency of the first fame as well as reducing the latency of the second frame as a side effect. In particular, the latency of the first frame will be reduced since it would be able to use the first of the two initial outgoing slots, which occurs sooner in time.

Figure 14A:
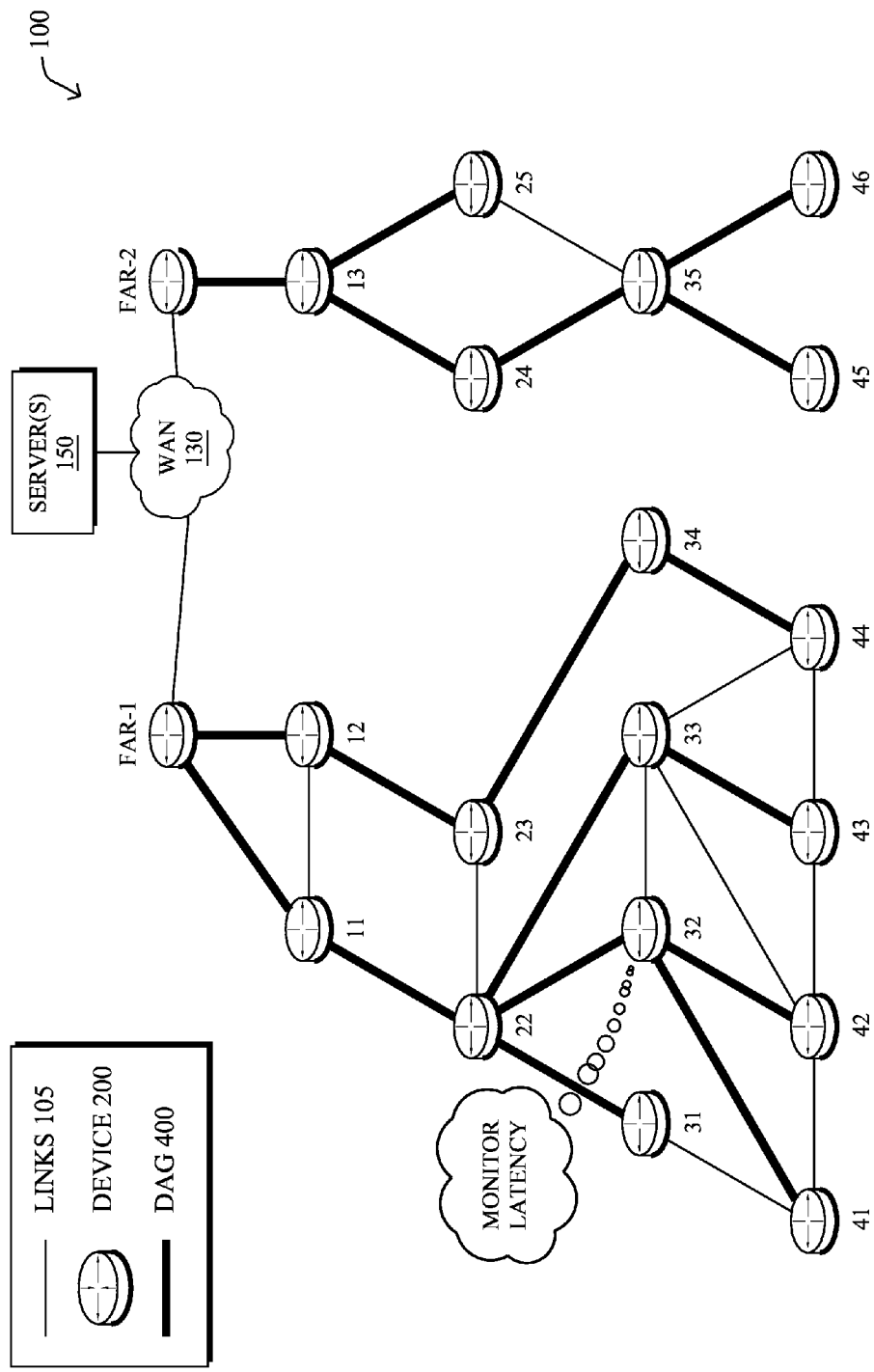
FIGS. 14A-14B illustrate an example of allocated timeslots being monitored.
Figure 14B:
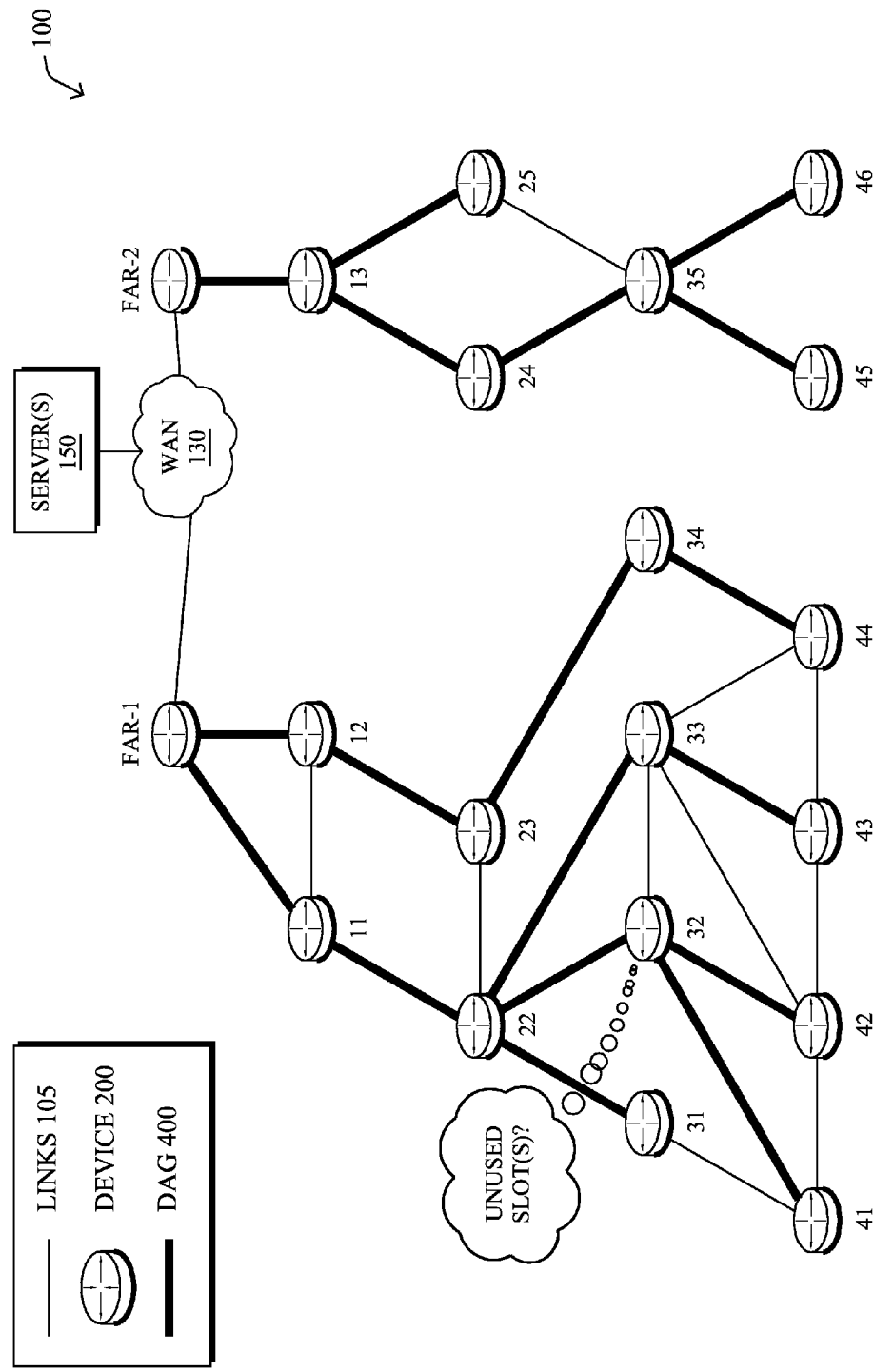

Referring now to FIGS. 14A-14B, an example is shown of allocated timeslots being monitored, according to various embodiments. As noted previously, if a time sensitive packet has not yet been tagged, the router may tag it for the next hop, as described above and shown in FIG. 9D. If the outgoing timeslot for the flow is not locked, then latency monitoring may also continue as normal, as shown in FIG. 14A. In some embodiments, if the flow disappears or misses its timeslot consistently, then the lock may be removed and the process restored. Notably, if a new timeslot was allocated, there may be an excess of outgoing timeslots. In some embodiments, the router may monitor unlocked timeslots/cells for a lack of use, and the least used one may be removed (e.g., by the router itself when sending traffic in the downward direction or in response to requesting that its parent node de-allocate the timeslot, if the parent controls the router's communication schedule).

In yet another embodiment, the disclosed timeslot changes may be limited to the nodes that exhibit latencies (e.g., the time between incoming and associated outgoing timeslots) that exceed a per-hop latency for a given flow. Such a mechanism allows triggering a timeslot update for periodic critical flows if and only if a flow experiences an unacceptable delay.

According to various embodiments, the timeslot mapping, allocation, and/or de-allocation mechanisms described above may be repeated by any or all parent nodes along a given communication path up to the root node of the network. In other words, the scheduling mechanisms may be used recursively, to ensure that the specified performance bounds for a given traffic flow are met. In contrast to a PCE that has an omniscient view of the network, timing adjustments may be made in a distributed manner within the network, with a given scheduling change propagating along the communication path (e.g., to accommodate a new, critical traffic flow).

Figure 15:
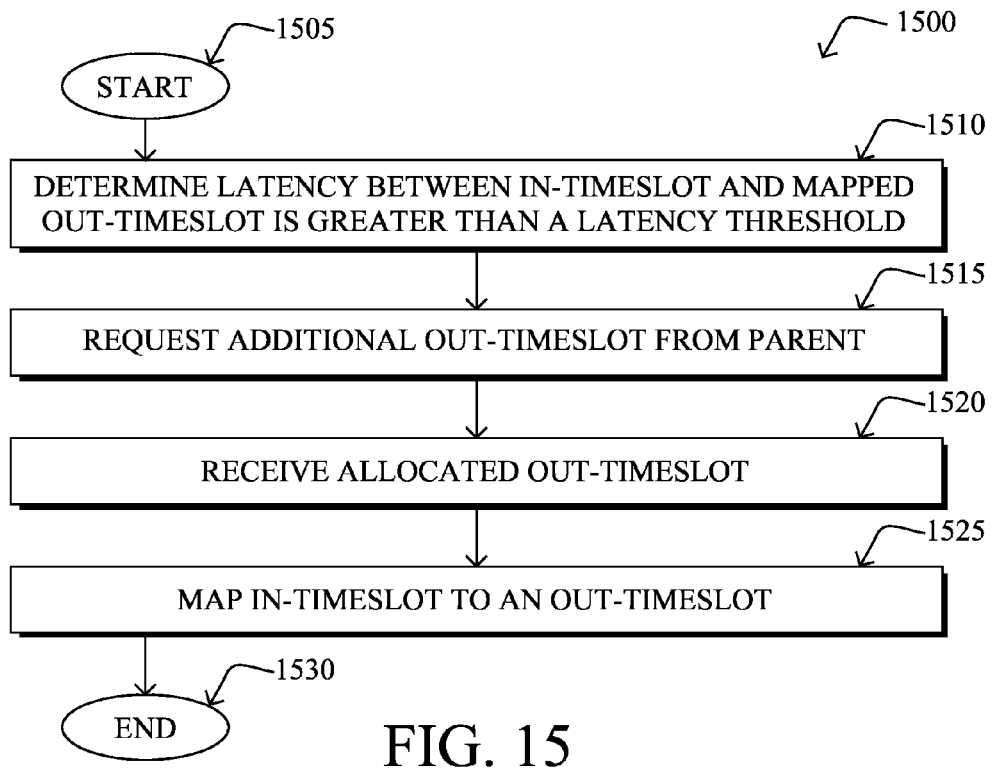
FIG. 15 illustrates an example simplified procedure for mapping a receive timeslot to a transmit timeslot.

FIG. 15 illustrates an example simplified procedure for mapping a receive timeslot to a transmit timeslot in a network in accordance with one or more embodiments described herein. The procedure 1500 may start at step 1505, and continues to step 1510, where, as described in greater detail above, a device (e.g., node 32 or another device described above) may determine that a latency between an inbound timeslot (e.g., a receive timeslot of a device's TSCH schedule) and mapped outbound timeslot (e.g., a transmit timeslot of the device's TSCH schedule) for a traffic flow is greater than a latency threshold. In one embodiment, the latency threshold may be a per-hop latency threshold. In other words, the time difference between when the router receives a packet of a given flow and when the router forwards the packet may be greater than an acceptable amount. In further embodiments, the latency threshold may be based on a debit and credit mechanism whereby a packet is "credited" any time below the per-hop latency threshold or "debited" any time in excess of the per-hop latency threshold. In other words, a cumulative measure of the packet's latency along the path may be maintained. The amount of latency debits may then be compared to a latency threshold, to determine whether the path latency is within acceptable limits.

At step 1515, the device requests an additional outbound timeslot from a parent node of the device, as described in greater detail above. In some implementations, the requested timeslot may be as close as possible in time to the inbound timeslot from step 1510. For example, the requested timeslot may occur sooner in time than the outbound timeslot previously mapped to the inbound timeslot. In many cases, a parent node in a TSCH network may have control over the communication schedules of its child nodes. Accordingly, the device may alternatively allocate the new timeslot directly, if the traffic flow is directed in the downward direction towards one of its child nodes.

At step 1520, the device receives an indication of a newly allocate timeslot, as detailed above. For example, the parent node of the device may adjust the communication schedule of the device such that a previously unused timeslot is allocated for outbound forwarding of packets by the device.

At step 1525, the device maps an inbound timeslot to one of the outbound timeslots in the communication schedule of the device, as described in greater detail above. In particular, for time-sensitive flows (e.g., delay and/or jitter sensitive flows) that are sent periodically, the inbound timeslot during which the flow is received may be mapped to one of the outbound timeslots allocated to the device. In one embodiment, the inbound timeslot may be mapped to the newly added timeslot of the device's communication schedule. In another embodiment, the inbound timeslot may be mapped to any of the available outbound timeslots. In either case, the latency for the traffic flow received in the inbound timeslot will be reduced. In some embodiments, the mapping between the inbound and outbound timeslots may be "locked" (e.g., used during each iteration of the communication schedule, periodically). For example, if the traffic flow received during the inbound timeslot is jitter-sensitive, the inbound timeslot may be mapped and locked to one of the outbound timeslots, such as the next available outbound timeslot or the newly allocated outbound timeslot. Procedure 1500 then ends at step 1530.

Figure 16:
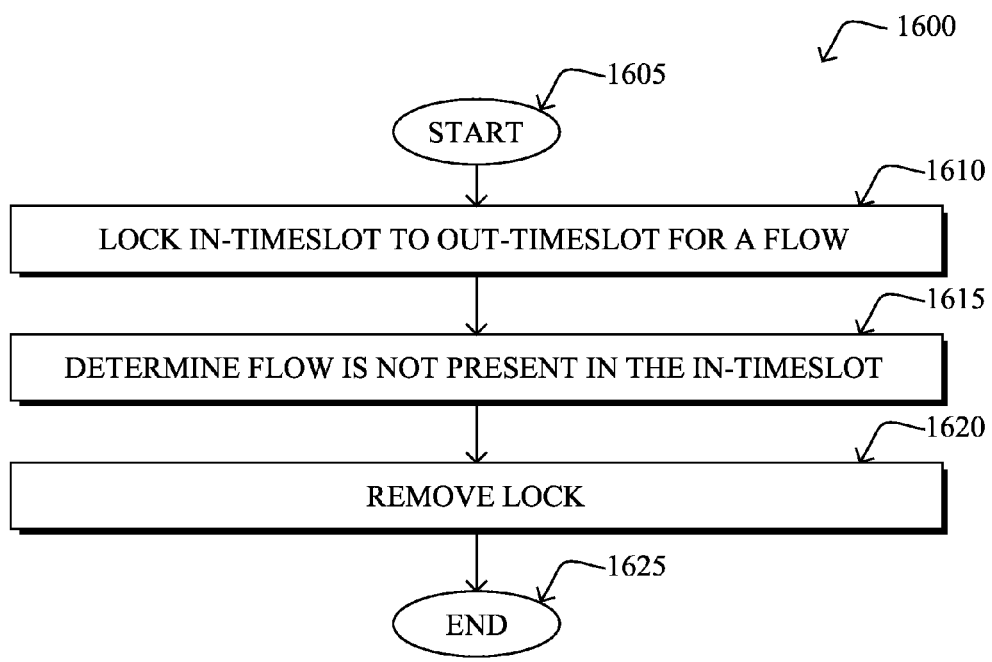
FIG. 16 illustrates an example simplified procedure for removing a locked mapping between timeslots.

FIG. 16 an example simplified procedure for removing a locked mapping between timeslots in accordance with one or more embodiments described herein. For example, node 32 or another such network device/node discussed above may remove a locked mapping using procedure 1600. The procedure 1600 may start at step 1605, and continues to step 1610, where, as described in greater detail above, the mapping between an inbound (e.g., receive) timeslot and an outbound (e.g., transmit) timeslot of a device may be locked. In other words, each periodic instance of the inbound timeslot may be mapped to the same corresponding outbound timeslot of a device/router's communication schedule, provided packets of a given traffic flow periodically make use of the inbound timeslot. Such a lock may be placed, for example, to ensure that a given traffic flow received in the inbound timeslot exhibits a bounded amount of jitter and/or delay across the router.

At step 1615, the device determines that the traffic flow is not present in the inbound timeslot, as detailed above. In particular, packets of a traffic flow may be tagged, thereby allowing a network node/router to distinguish different traffic flows. After locking the mapping between the inbound timeslot to a particular outbound timeslot (e.g., to provide a bound to the delay and/or jitter of the traffic flow), the device may monitor use of the inbound timeslot. Based on this monitoring, the device may determine that the traffic flow associated with the inbound timeslot is no longer being sent during the timeslot. For example, the traffic flow may have ceased to exist, routing changes may have occurred in the network, or the traffic flow consistently fails to be sent on time.

At step 1620, as described in greater detail above, the mapping lock between the inbound and outbound timeslots is removed based on the determination from step 1615 that the traffic flow is no longer present in the inbound timeslot. In other words, the outbound timeslot may be freed for mapping to another traffic flow arriving during another timeslot. Procedure 1600 then ends at step 1625.

Figure 17:
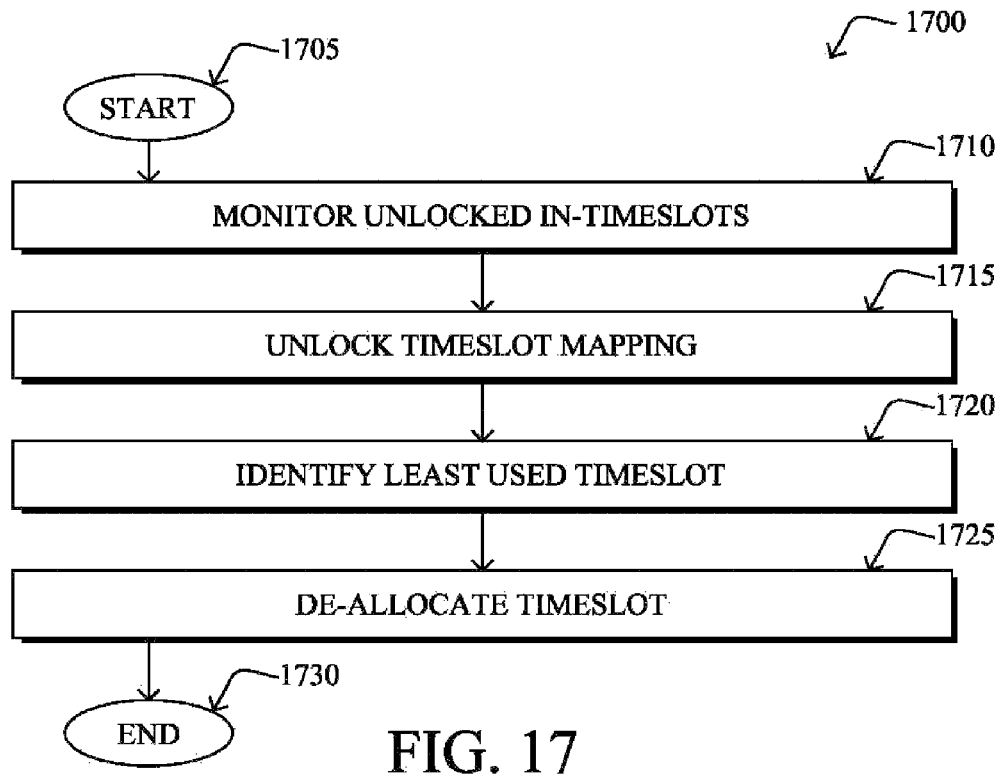
FIG. 17 illustrates an example simplified procedure for de-allocating a timeslot.

FIG. 17 illustrates an example simplified procedure for de-allocating a timeslot in accordance with one or more embodiments described herein. Notably, procedure 1700 may be performed by node 32 or by any other network node/device discussed above. The procedure 1700 may start at step 1705, and continues to step 1710, where, as described in greater detail above, unlocked mappings between inbound (e.g., receive) timeslots and outbound (e.g., transmit) timeslots are monitored. Such mappings may, for example, be changed during future iterations of the TSCH schedule of a device/router.

At step 1715, as detailed above, a mapping between an inbound and outbound timeslot may be unlocked. For example, if a jitter-sensitive flow no longer appears during the inbound timeslot, the device/router may unlock the mapping, thereby allowing other inbound timeslots to use the outbound timeslot.

At step 1720, a least-used outbound timeslot is identified, as described in greater detail above. For example, if a timeslot is unlocked as a result of a critical traffic flow no longer being sent, this may indicate that the device/router has too many allocated outbound timeslots. In another example, outbound timeslot usage may be monitored continuously or periodically (e.g., after a new outbound timeslot is allocated), to ensure that the outbound timeslots allocated to the device are still used.

At step 1725, as detailed above, the least-used timeslot may be de-allocated. In one embodiment, the device may request that its parent node de-allocate the timeslot. For example, if the parent node of the device has control over the communication schedule of the device, the parent may be contacted to de-allocate the timeslot. The device may then receive an instruction in response from the parent node to de-allocate the timeslot. In other implementations, if the timeslot corresponds to a cell of a chunk owned by the device itself, the device may de-allocate the timeslot. Procedure 1700 then ends at step 1730.

Figure 18:
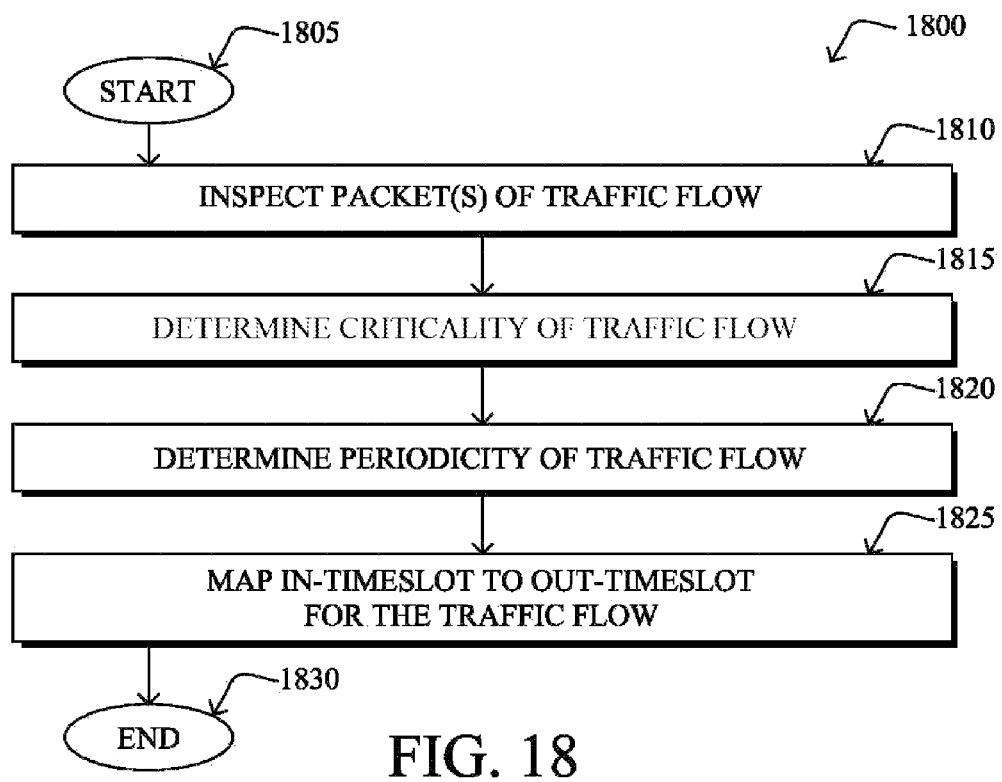
FIG. 18 illustrates an example simplified procedure for mapping timeslots based on characteristics of a traffic flow.

FIG. 18 illustrates an example simplified procedure for mapping timeslots based on characteristics of a traffic flow in accordance with one or more embodiments described herein. The procedure 1800 may start at step 1805, and continues to step 1810, where, as described in greater detail above, packets of a traffic flow are inspected. In some embodiments, a traffic flow packet may include metadata that indicates that the traffic flow is time-sensitive (e.g., the traffic flow is sensitive to latency and/or jitter). In further embodiments, the packet may be explicitly tagged by a prior node along the communication path, to identify the traffic flow as a critical flow.

At step 1815, the criticality of the traffic flow may be identified, as described in greater detail above. In particular, certain types of traffic may be more critical than others, requiring greater control over the delivery of the packets. For example, video traffic may be more time-sensitive and more critical than web traffic, in some cases. As noted above, a packet of a traffic flow may be tagged or otherwise include metadata that may be inspected to detect the criticality of the traffic flow.

At step 1820, the periodicity of the traffic flow may be identified, as detailed above. For example, in one embodiment, the periodicity of a traffic flow may be identified by examining the inbound timeslot(s) used by the traffic flow to generate a time series model. Such a model may then be used to identify the periodicity of the traffic flow. In other cases, packets of the traffic flow may already be tagged with such information by a prior node in the communication path.

At step 1825, an inbound timeslot of the device associated with the traffic flow may be mapped to an outbound timeslot of the device, as described in greater detail, based on the criticality and periodicity of the traffic flow. For example, if a critical traffic flow is received periodically by the device in the same inbound timeslot, the device may map that timeslot to an outbound timeslot while accounting for the criticality of the traffic flow (e.g., to satisfy the jitter and/or latency requirements of the flow). In some cases, the mapping may even be locked such that outbound timeslot is reserved for periodic use by the traffic flow. Procedure 1800 then ends at step 1830.

It should be noted that while certain steps within procedures 1500-1800 may be optional as described above, the steps shown in FIGS. 15-18 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1500-1800 are described separately, certain steps from each procedure may be incorporated into each other procedure, and the procedures are not meant to be mutually exclusive.

The techniques described herein, therefore, provide for a distributed mechanism that may be used to improve the global network behavior of critical traffic flows. In some aspects, the latency and/or jitter of a traffic flow may be controlled via the distributed scheduling mechanisms disclosed herein.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a device in a network, that a latency between a receive timeslot of a channel hopping schedule of the device and a transmit timeslot of the channel hopping schedule is greater than a latency threshold for a particular traffic flow to be received during the receive timeslot;

requesting, by the device, an additional transmit timeslot for the channel hopping schedule from a parent node of the device in the network;

receiving, at the device, an indication of a newly allocated transmit timeslot for the channel hopping schedule from the parent node; and mapping, by the device, the receive timeslot to one of the transmit timeslots of the channel hopping schedule, wherein the particular traffic flow is to be forwarded to a second device during the mapped transmit timeslot.

2. The method as in claim 1, wherein the receive timeslot is mapped to the newly allocated transmit timeslot, the method further comprising:

locking the mapping between the receive timeslot and the newly allocated transmit timeslot for periodic transmission of the particular traffic flow to the second device.

3. The method as in claim 2, wherein the mapping between the receive timeslot and the newly allocated transmit timeslot is locked based on a jitter requirement associated with the particular traffic flow.

4. The method as in claim 2, further comprising:
determining that the traffic flow is not present in the receive timeslot; and, in response,
unlocking the mapping between the receive timeslot and the newly allocated transmit timeslot.

5. The method as in claim 4, further comprising:
monitoring unlocked transmit timeslots of the channel hopping schedule, wherein the unlocked transmit timeslots do not have locked mappings with corresponding receive timeslots in the channel hopping schedule;
identifying a least used transmit timeslot from among the unlocked transmit timeslots of the channel hopping schedule, in response to the mapping between the receive timeslot and the newly allocated transmit timeslot being unlocked; and
requesting that the parent node de-allocate the least used transmit timeslot from the channel hopping schedule.

6. The method as in claim 1, further comprising:
receiving an indication of a priority and a periodicity of the particular traffic flow, wherein the latency threshold is based on the priority of the particular traffic flow, and wherein the receive timeslot is mapped to the mapped transmit timeslot based on the periodicity of the particular traffic flow.

7. The method as in claim 1, further comprising:
inspecting packets of the particular traffic flow;
determining a priority of the particular traffic flow based on the inspected packets; and
determining a periodicity of the particular traffic flow based on the inspected packets,
wherein the latency threshold is based on the priority and the periodicity of the particular traffic flow.

8. The method as in claim 1, wherein the latency threshold is a single hop latency threshold associated with the device.

9. The method as in claim 1, wherein the latency threshold corresponds to a maximum allowed deviation from a path latency for the particular traffic flow.

10. The method as in claim 1, wherein the latency between the receive timeslot and the newly allocated timeslot is below the latency threshold.

11. An apparatus, comprising:
one or more network interfaces to communicate with a network;
a processor coupled to the network interfaces and configured to execute one or more processes; and
a memory configured to store a process executable by the processor, the process when executed operable to:
determine that a latency between a receive timeslot of a channel hopping schedule of the apparatus and a transmit timeslot of the channel hopping schedule is greater than a latency threshold for a particular traffic flow to be received during the receive timeslot;
request an additional transmit timeslot for the channel hopping schedule from a parent node of the apparatus in the network;
receive an indication of a newly allocated transmit timeslot for the channel hopping schedule from the parent node; and
map the receive timeslot to one of the transmit timeslots of the channel hopping schedule, wherein the particular traffic flow is to be forwarded to a second device during the mapped transmit timeslot.

12. The apparatus as in claim 11, wherein the receive timeslot is mapped to the newly allocated transmit timeslot, wherein the process when executed is further operable to:
lock the mapping between the receive timeslot and the newly allocated transmit timeslot for periodic transmission of the particular traffic flow to the second device.

13. The apparatus as in claim 12, wherein the mapping between the receive timeslot and the newly allocated transmit timeslot is locked based on a jitter requirement associated with the particular traffic flow.

14. The apparatus as in claim 12, wherein the process when executed is further operable to:
determine that the traffic flow is not present in the receive timeslot; and, in response,
unlock the mapping between the receive timeslot and the newly allocated transmit timeslot.

15. The apparatus as in claim 14, wherein the process when executed is further operable to:
monitor unlocked transmit timeslots of the channel hopping schedule, wherein the unlocked transmit timeslots do not have locked mappings with corresponding receive timeslots in the channel hopping schedule;
identify a least used transmit timeslot from among the unlocked transmit timeslots of the channel hopping schedule, in response to the mapping between the receive timeslot and the newly allocated transmit timeslot being unlocked; and
request that the parent node de-allocate the least used transmit timeslot from the channel hopping schedule.

16. The apparatus as in claim 11, wherein the process when executed is further operable to:
receive an indication of a priority and a periodicity of the particular traffic flow, wherein the latency threshold is based on the priority of the particular traffic flow, and wherein the receive timeslot is mapped to the mapped transmit timeslot based on the periodicity of the particular traffic flow.

17. The apparatus as in claim 11, wherein the process when executed is further operable to:
inspect packets of the particular traffic flow;
determine a priority of the particular traffic flow based on the inspected packets; and
determine a periodicity of the particular traffic flow based on the inspected packets,
wherein the latency threshold is based on the priority and the periodicity of the particular traffic flow.

18. The apparatus as in claim 11, wherein the latency threshold is a single hop latency threshold associated with the device.

19. The apparatus as in claim 11, wherein the latency threshold corresponds to a maximum allowed deviation from a path latency for the particular traffic flow.

20. The apparatus as in claim 11, wherein the latency between the receive timeslot and the newly allocated timeslot is below the latency threshold.

21. A tangible, non-transitory, computer-readable media having software encoded thereon, the software when executed by a processor operable to:
    determine that a latency between a receive timeslot of a channel hopping schedule and a transmit timeslot of the channel hopping schedule is greater than a latency threshold for a particular traffic flow to be received during the receive timeslot;
    request an additional transmit timeslot for the channel hopping schedule from a parent node;
    receive an indication of a newly allocated transmit timeslot for the channel hopping schedule from the parent node; and
    map the receive timeslot to one of the transmit timeslots of the channel hopping schedule, wherein the particular traffic flow is to be forwarded to a second device during the mapped transmit timeslot.

\* \* \* \* \*